United States Patent [19]
Ma

[11] Patent Number: 5,757,478
[45] Date of Patent: May 26, 1998

[54] REMOTE POSITION SENSING APPARATUS AND METHOD

[76] Inventor: Chris Chen-Hsing Ma, 2888 East 16th Avenue, Vancouver, British Columbia, Canada, V5M 2M1

[21] Appl. No.: 655,082

[22] Filed: Jun. 3, 1996

[51] Int. Cl.$^6$ .................................................. G01B 11/26
[52] U.S. Cl. ................................. 356/141.2; 356/141.3
[58] Field of Search .......................... 356/141.2, 141.3, 356/141.5

[56] References Cited

U.S. PATENT DOCUMENTS

| | | | |
|---|---|---|---|
| 3,435,246 | 3/1969 | Webb | 356/141.2 |
| 3,794,245 | 2/1974 | Aver | 250/203 R |
| 4,999,483 | 3/1991 | Okamoto | 250/203.1 |
| 5,018,853 | 5/1991 | Hechel et al. | |
| 5,264,910 | 11/1993 | Hill | 355/141 |
| 5,440,392 | 8/1995 | Pettersen et al. | |
| 5,510,893 | 4/1996 | Suzuki | 356/139.03 |
| 5,640,241 | 6/1997 | Ogawa | 356/375 |

OTHER PUBLICATIONS

Smith, R. L., "Development and testing of an infrared target tracking system," Master's Thesis, Department of Electrical Engineering, University of British Columbia, Vancouver, B. C., Canada, Aug. 1990.

Northern Digital Inc. OPTO TRAK 3020 Position Sensor, 403 Albert Street, Waterloo, Ontario, Canada N2L 3V2.

Ma, C. C. H., C. K. Tan and P. D. Lawrence, "Multi-pinhole wide-angle high-resolution light position detector," IEEE Transactions on Instrumentation and Measurement, vol. 45, No. 1, Feb. 1996.

*Primary Examiner*—Mark Hellner
*Attorney, Agent, or Firm*—Oyen, Wiggs, Green & Mutala

[57] ABSTRACT

A sensor for determining a one-dimensional component of the angular orientation of a radiation source relative to the sensor has a radiation sensitive element which produces an electrical signal representative of radiation incidence upon the element. A radiation-opaque mask is mounted between the element and the radiation source. A first plurality of parallel slit apertures are provided in the mask. The slits are spaced relative to one another, and the element is aligned relative to the mask, such that radiation emitted by the source through at least one of the slits is simultaneously incident upon at least two independent radiation-sensitive points on the element while the source is within an intended operational range of the sensor; and, the points are displaced from the one slit by different distances.

22 Claims, 15 Drawing Sheets

REMOTE POSITION SENSING APPARATUS AND METHOD

FIELD OF THE INVENTION

This application pertains to an apparatus and method for determining one or two one-dimensional coordinates of the angular orientation of a point radiation source relative to a reference point. This is achieved at high resolution over a large angular operating range, without moving parts. By combining several subsystems, each embodying the invention, one may by triangulation deduce the three-dimensional position of the radiation source relative to a reference point.

BACKGROUND OF THE INVENTION

High accuracy position detection systems capable of operating over wide angular ranges are useful in a variety of situations. For example, lithotripsy is a medical procedure in which ultrasound radiation is carefully focused on a kidney stone to destroy the kidney stone. This requires that an ultrasound radiation source be accurately positioned relative to the kidney stone. Conventionally, an ultrasound-sensitive probe mounted at one end of a multi-jointed mechanical linkage is moved into position adjacent the patient's body, in close proximity to the location of the kidney stone. The opposite end of the linkage is fixed to the ultrasound radiation source. A plurality of detectors such as linear or angular potentiometers or optical encoders on the linkage provide an indication of the position of each linkage element relative to the next element. In combination, the detectors indicate the position of the ultrasound radiation source relative to the kidney stone. However, this mechanical arrangement is cumbersome, expensive and prone to error.

High accuracy position detection systems are also commonly used in a variety of robotics applications. It is expected that such systems may also prove useful in the application of virtual reality technology. For example, virtual reality games may require a player to interact with images projected within a relatively small space by a computer. In such case it may be advantageous to accurately detect the position of a hand held actuator of some sort relative to a spatial reference point.

It is well-known that the operating range of a basic direction detector incorporating a position-sensitive element ("sensing element") having known resolution and no moving parts is inversely proportional to the detector's ability to detect a target via a single reading. In other words, a given basic detector will exhibit a constant ratio of range divided by one-reading resolution. Because smaller resolution values are preferable to larger resolution values, in order to improve either the operating range or the one-reading resolution of a direction detector, without trading off either range or resolution, one must employ either a larger sensing element, or a sensing element of fundamentally better quality. Due to this limitation, large, expensive sensing elements and/or elements having more numerous pixel arrays, such as PSDs (Position Sensitive Devices) are commonly used for analog sensing of the centroid position of a light source, and CCDs (Charge Coupled Devices) are used in digital imagery.

One obvious way of overcoming the above limitation is to employ several direction detectors, with each covering a different segment of a desired large operational range. This is an expensive solution and is subject to the "sensor-fusion" problem (the problem of appropriately combining all sub-system outputs to generate one accurate final reading for the system).

Another known solution is to scan a narrow range detector over the larger desired range, as is done in radar and some other detection systems (see for example Smith, R. L., "Development and Testing of an Infrared Target Tracking System", Master's thesis, Department of Electrical Engineering, University of British Columbia, Vancouver, B.C., Canada, August 1990). The problem with this solution is that the accuracy of the system output depends not only on the quality of the sensing element which directly detects the direction of the target relative to a reference point, but also on the quality of the sensing devices which detect the coordinates of the scanned component(s) of the system. Such detection devices inherently exhibit errors which normally accumulate, making the final output of the detection system possibly more erroneous than the output of a single sensing element system. Moreover, the mechanical scanning mechanisms typically incorporated in such systems require periodic maintenance and/or replacement.

Another known solution is to take multiple readings of the direction of the target, then process the readings to yield a final reading having better resolution. This signal processing technique can be applied to all detection systems. However, other system attributes such as sampling frequency or hardware/software complexity must be traded off in order to improve overall resolution.

U.S. Pat. No. 5,440,392 issued 8 Aug. 1995 for an invention of Pettersen et al describes a system and method for measuring the spatial coordinates of a point in space. The point in space is touched with a rigid touch-probe carrying at least three point-sized light sources which are simultaneously illuminated. The light is projected by a standard spherical optical focusing lens unit to create an image on a two-dimensional ("2D") array CCD or CID (Charge Injected Device) sensing element. The positions of the light spots cast on the element are determined. Image processing and least-squares based photogrammetric techniques are then applied to deduce first the translation and orientation of the touch probe, then the three spatial coordinates of the touch point.

Another prior art approach is exemplified by the OPTO TRAK™ position sensing system available from Northern Digital Inc. of Waterloo, Ontario, Canada. This system detects the three independent coordinates of the location of a single point-sized source of light in space with respect to the system. It employs three detectors which are rigidly spaced apart, each of which detects only one coordinate of the direction of the light source with respect to itself. These coordinates are processed together with the known relative positions and orientations between the three one-dimensional ("1D") detectors to deduce the location of the light source. To detect the orientation of an object, the system treats the object in a manner similar to that in which the Pettersen et al patent treats the touch probe. Three or more point light sources can be strategically mounted on the object. Then, by turning the light sources on one at a time, their locations can be sequentially detected then combined to deduce the orientation of the object. Each of the three detectors incorporates a 1D CCD array sensing element and a dedicated optical lens assembly.

In contrast to the Pettersen et al system, the OPTO TRAK™ system is capable of detecting the location of more than one light source only sequentially, which can introduce errors if the light sources are in motion. However, this disadvantage can be made insignificant if the location of each light source can be sampled at a high rate compared to the velocities of the light sources.

The OPTO TRAK™ system uses three 1D detectors which are spaced widely apart, while the Pettersen et al system uses just one 2D detector. Since both systems use similar triangulation methods to detect depth information, the OPTO TRAK™ system's depth detection accuracy can be expected to be superior to that of the Pettersen et al system.

A feature common to both the OPTO TRAK™ and Pettersen et al systems is their use of lenses to focus light onto their respective sensing element(s). This results in a problem well-known to camera users: the angular operating range is limited to approximately ±15 degrees. Although wide angle lenses can be used to enlarge these ranges, doing so causes severe aberration distortion in the image, which degrades resolution, and shortens the depth range within which accurate detection can be made. Thus, once again faces the inherent limitation that a given sensing element deployed over an operating range exhibits a constant ratio of range divided by one-reading resolution.

U.S. Pat. No. 5,018,853 issued 28 May, 1991 for an invention of Hechel et al discloses an automotive vehicle wheel alignment system in which an angle sensor senses a one-dimensional coordinate of the angular orientation of a point light source relative to the sensor. The sensor comprises a one-dimensional line-array CCD sensing element separated from the light source by an opaque mask having a single slit aperture. The long, narrow CCD element is aligned perpendicular to the slit. Thus, a line of light emitted by the source through the slit is incident upon a small segment (a "point") of the CCD element. By deducing the position of this point with respect to the CCD element, a one-dimensional coordinate of the angular orientation of the light source can be determined. The Hechel et al sensor has less problem with angular operating range, but is still subject to the inherent limitation on sensor resolution mentioned above.

The present invention overcomes the resolution limitation problem by effectively multiplexing signals received through multiple "windows" onto one sensing element. A "window" is an access port through which signal(s) can be received by a sensing element. For example, the lens unit of the Pettersen et al detector is a window, as is the slit aperture in the mask used in the Hechel et al sensor. The OPTO TRAK™, Pettersen et al and Hechel et al systems each employ only one window per sensor. The present inventor has disclosed a prior art multiple window orientation angle sensor: see Ma, C. C. H., C. K. Tan and P. D. Lawrence, "Multi-Pinhole Wide-Angle High-Resolution Light Position Detector", IEEE Transactions on Instrumentation and Measurement, Vol. 45, No. 1, February 1996, as hereinafter described. However, the inventor's prior art sensor is subject to a number of deficiencies as hereinafter explained, which are overcome by the present invention.

SUMMARY OF THE INVENTION

In one embodiment, the present invention provides a sensor for determining a one-dimensional component of the angular orientation of a radiation source relative to the sensor. The sensor may for example have a radiation sensitive element which produces an electrical signal representative of radiation incidence upon the element. A radiation-opaque mask is mounted between the element and the radiation source. A first plurality of parallel slit apertures are provided in the mask. The slits are spaced relative to one another, and the element is aligned relative to the mask, such that radiation emitted by the source through at least one of the slits is simultaneously incident upon at least two independent radiation-sensitive points on the element while the source is within an intended operational range of the sensor; and, the points are displaced from the one slit by different distances.

The invention further provides a sensor for determining two one-dimensional components of the angular orientation of a radiation source relative to the sensor. In an exemplary embodiment, a radiation sensitive element produces an electrical signal representative of radiation incidence upon the element, and a radiation-opaque mask is mounted between the element and the source. The mask has a first plurality of parallel slit apertures lying in a first plane and, a second plurality of parallel slit apertures lying in the first plane and extending perpendicular to the first plurality of slit apertures. The radiation sensitive element lies in a second plane inclined with respect to the first plane about an axis perpendicular to the first plurality of slits and further inclined with respect to an axis perpendicular to the second plurality of slits. The first plurality of slits are spaced relative to one another, the second plurality of slits are spaced relative to one another, and the element is aligned relative to the mask, such that (a) radiation emitted by the source through at least one of the first plurality of slits is simultaneously incident upon at least two independent radiation-sensitive first points on the element while the source is within an intended operational range of the sensor, and (b) radiation emitted by the source through at least one of the second plurality of slits is simultaneously incident upon at least two independent radiation-sensitive second points on the element while the source is within an intended operational range of the sensor. The first points are displaced from the one first plurality slit by different distances; and, the second points are displaced from the one second plurality slit by different distances.

The invention further provides a method of identifying, within a plurality of parallel slit apertures in a radiation-opaque mask separating a radiation source from a reference plane, one of the apertures through which radiation emitted by the source is incident upon a radiation sensitive element positioned between the mask and the reference plane, such that radiation is simultaneously incident upon at least two independent radiation-sensitive points on the element, and the points are at different distances from the reference plane. In one exemplary embodiment of the method, for each aperture a range of angles for which radiation emitted by the source passes through that aperture and is incident upon the element is predetermined. An angle $\theta = \arctan(SID/HT)$ is derived with respect to the points. SID is the distance vector between any two such points in a direction parallel to the reference plane and perpendicular to the apertures. HT is the distance vector between the one point in a direction perpendicular to the reference plane. The deduced angle $\theta$ is compared with the predetermined range of angles. The aperture for which the predetermined range of angles contains the deduced angle $\theta$ is selected as the one aperture through which radiation emitted by the source is incident upon the element.

DETAILED DESCRIPTION OF THE PREFERRED EMBODIMENT

Figure 1:
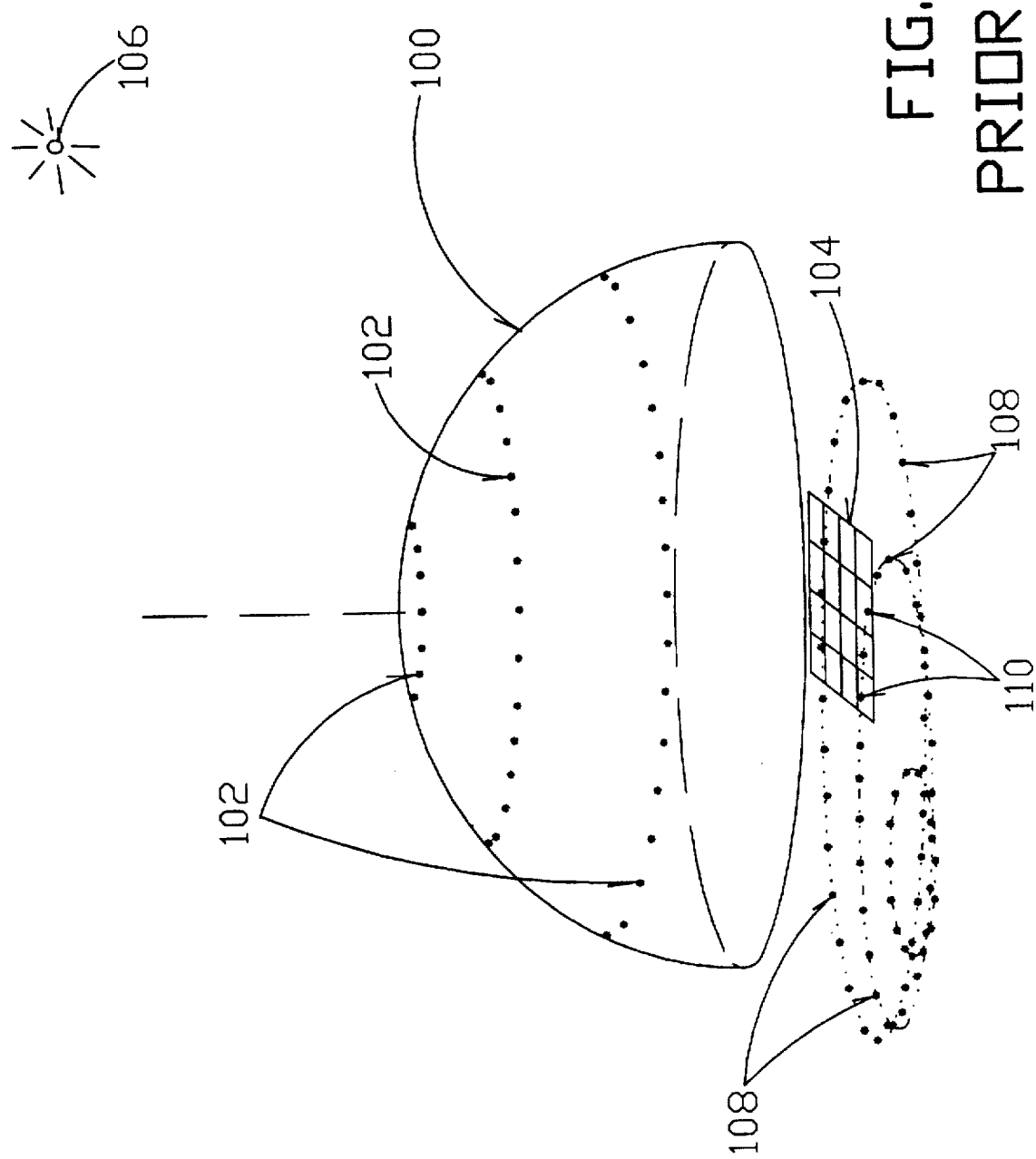
FIG. 1 depicts a prior art sensor developed by the present inventor.

The FIG. 1 Prior Art

FIG. 1 depicts the inventor's aforementioned prior art sensor, which detects two coordinates of the direction of a point-sized radiation source with respect to the sensor. The FIG. 1 sensor was prototyped with a commercial 2D CCD camera in which a hemispherical opaque mask 100 was substituted for the camera's lens unit. Three concentric rings of pinholes 102 were drilled through mask 100, on planes parallel to that of the camera's CCD element 104 (the "sensing plane"). The spacings between adjacent pinholes in the same ring were made significantly smaller than the spacings between adjacent rings. When a point radiation source 106 is illuminated within the angular operating range of the sensor, three rings of radiation spots 108 are cast onto the sensing plane, with a few spots 110 being cast on and sensed by CCD element 104.

Among the spots sensed 110, those which are cast by the same ring of pinholes can be identified by suitable image processing, since their interspacings are quite different from the spacings between spots cast by holes in different rings. As long as at least three spots cast from the same ring are sensed, a notional circle can be fitted through them. The radius of the notional circle should be quite close to that of the ring of pinholes which cast the sensed spots, assuming that radiation source 106 is quite distant from the sensor. Therefore, the ring which cast the sensed spots can be identified. The relative position of a given sensed spot with respect to the center of the notional circle determines the particular pinhole which cast that spot. Since the position of each pinhole is known in advance (by suitable calibration of the sensor) notional lines drawn through the sensed spots and the respective pinholes which cast those spots provide the direction coordinates of the radiation source relative to the sensor.

The FIG. 1 sensor was found to have an operating range about twice that of a sensor using a lens as a single "window" for detecting the direction of a radiation source, as in the OPTO TRAK™ and Pettersen et al systems. The aforementioned prototype of the FIG. 1 sensor, although crudely made, was also found to have better position detection resolution and accuracy than the original lens-equipped camera (a lens-equipped camera is, in hardware terms, similar to the detector of Pettersen et al). In theory, the resolution and operating range of the FIG. 1 sensor could be improved proportionally by increasing the number of rings of pinholes 102 on mask 100 without replacing CCD element 104. Moreover, the FIG. 1 sensor is focus-free, making it possible to detect the direction of a radiation source located at any depth, as long as the radiation source is sufficiently intense.

Despite its advantages, the FIG. 1 sensor is subject to a number of deficiencies. For example, it is difficult to make hemispherical mask 100 and pinhole rings 102 with sufficient accuracy. Also, because radiation spots 110 may be incident anywhere upon CCD element 104, the entire CCD element must be sampled for image processing purposes. This can be time-consuming, and lowers the sensor's maximum possible sensing frequency. Further, the time and effort required to process a 2D image increases at least proportionally with the size of the image area. Since the entire image "seen" by CCD element 104 must be processed, it is difficult to operate the sensor at high frequency given a fixed amount of computing power. Additionally, the process of fitting a large circle over points taken from a small arc is prone to error. In combination, these deficiencies can make a detection system expensive and reduce the maximum possible sampling frequency to the point that it becomes impractical to attempt detection of the orientation of an object by sequentially detecting the locations of several radiation sources mounted on the object.

The Invention—Introduction

The present invention provides two different sensing methods, and various embodiments thereof, each of which improves significantly over the FIG. 1 prior art. Both methods utilize a multi-window technique to simultaneously achieve wide angular operating range and robust, high one-reading angle sensing resolution. Either method may be used to detect one or two one-dimensional components of the angular orientation of a line-of-sight type radiation source with respect to the sensor. Embodiments which sense a single one-dimensional component of the angular orientation are referred to as 1D sensors, while those which sense two components are referred to as 2D sensors.

As described below in greater detail, both methods utilize a multiple aperture mask through which radiation emanating from a point radiation source is cast upon a sensing element. The mask and its apertures are sized and positioned, relative to the sensing element, to ensure that radiation passing through a minimum number of the mask's apertures will be simultaneously cast upon the sensing element. The angular orientation of the radiation source relative to the sensor is determined by linear projection, after determination of the particular aperture through which a particular ray of radiation is cast upon the sensing element. In the first method, such determination is made by attempting to sense ray(s) of radiation cast upon the sensing element at two separate points which are at different vertical displacements relative to the mask. In the second method, the determination is made by coding the interspacings between the mask's apertures, such that radiation cast through a few apertures uniquely characterizes the particular apertures casting such radiation.

1D Sensors According to the First Method

A fundamental object of the invention is to provide a sensor capable of detecting the angular orientation, relative to the sensor, of a single directly-emitting or reflected omni-directional point-source of line-of-sight type radiation. Hereinafter, the radiation is assumed to be directly emitted. Exemplary types of radiation include visible light, infrared light, x-ray radiation and acoustic sound. The ultimate purpose of the invention is to determine the three-dimensional ("3D") location of the radiation source with respect to the sensor. It is assumed that the distance between the radiation source and the sensor is significantly greater than the physical dimensions of the sensor, say 20:1 or more.

Figure 2:
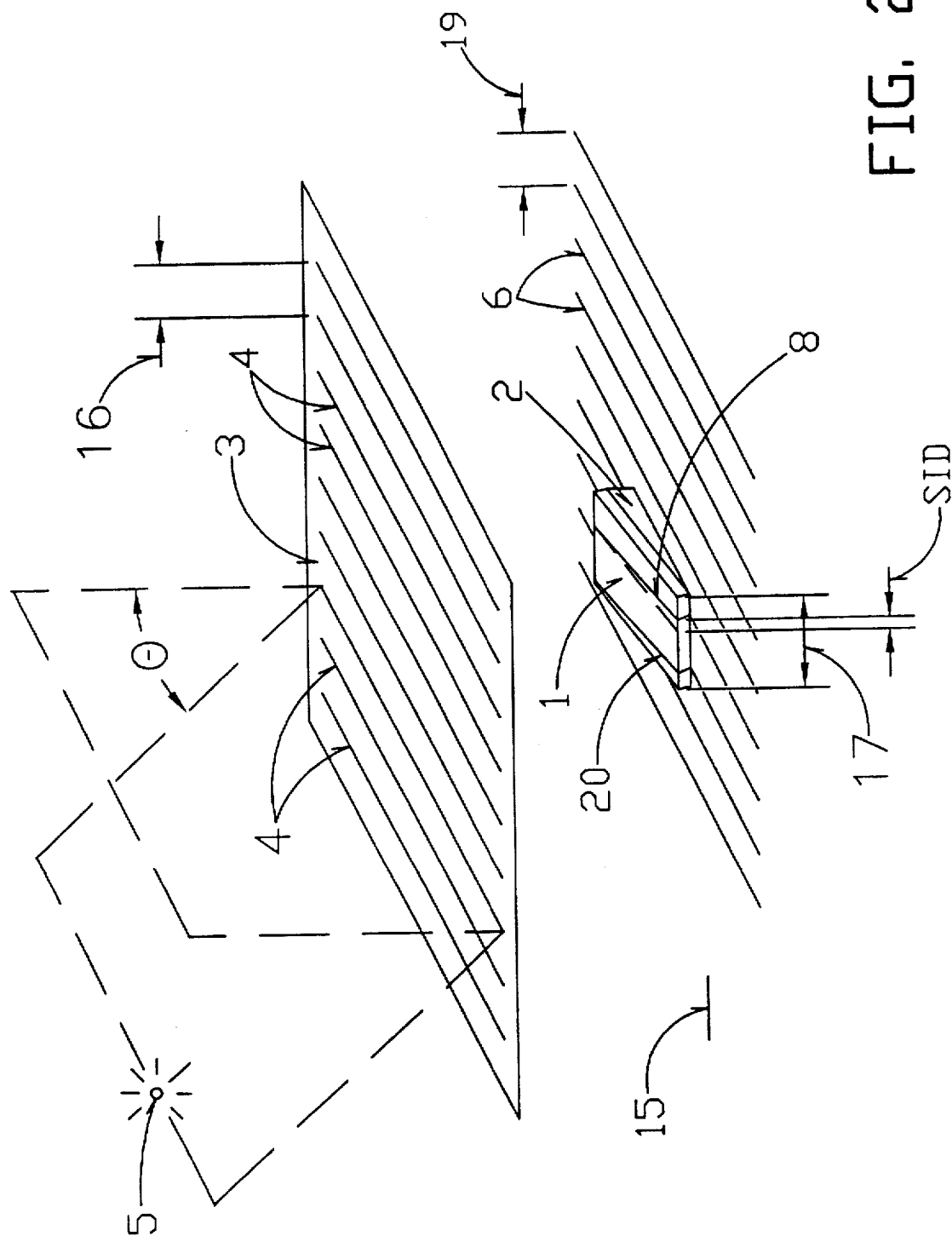
FIG. 2 is an oblique perspective illustration of a one-dimensional sensor constructed in accordance with the present invention.
Figure 3:
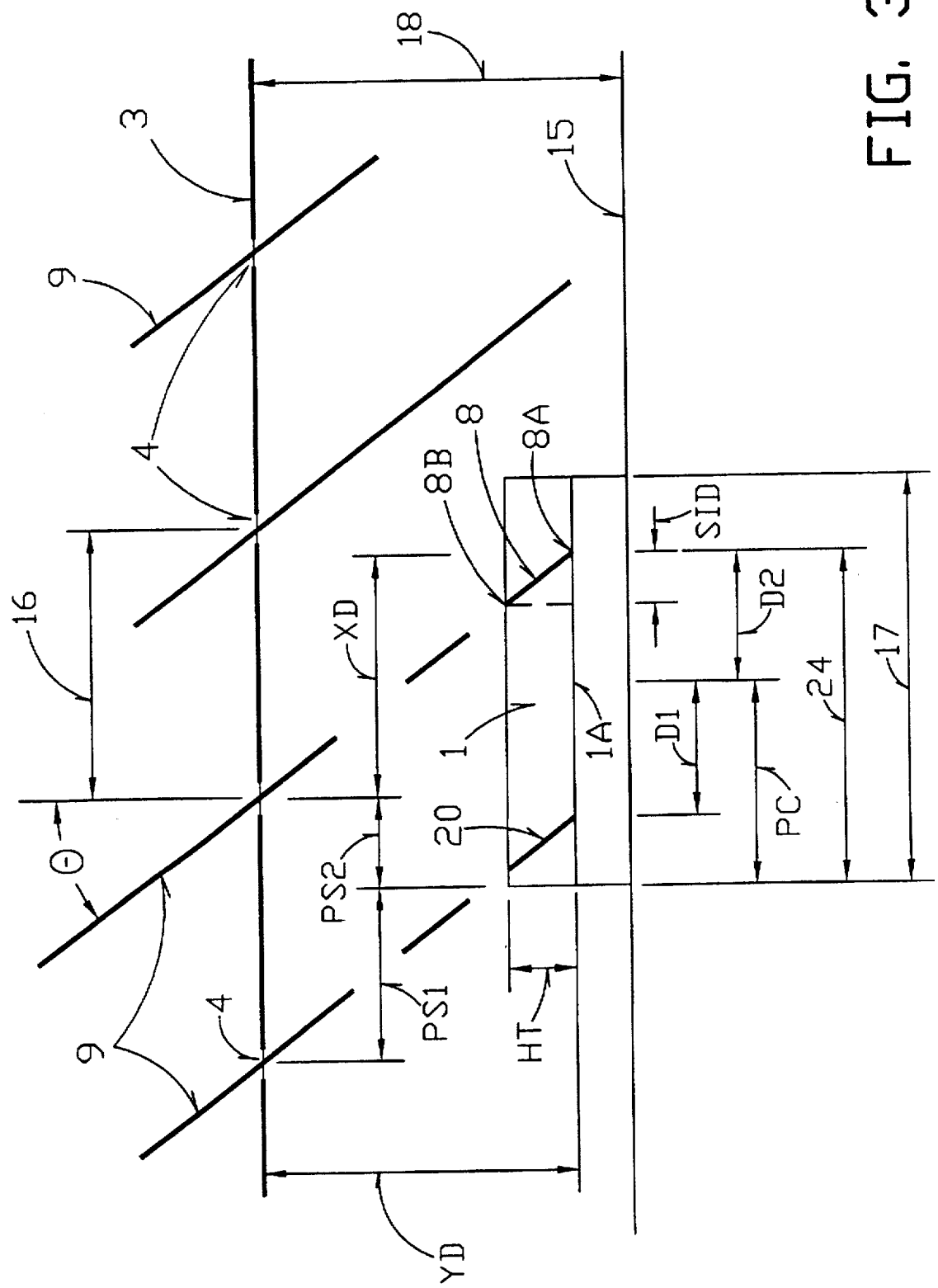
FIG. 3 is a front elevation view of the FIG. 2 sensor.

FIGS. 2 and 3 illustrate a preferred embodiment of a 1D sensor which operates in accordance with the first method mentioned above to detect one one-dimensional component of the angular orientation of a point radiation source 5 relative to radiation sensing element 1. A system incorporating three or more suitably arranged sensors of this type may be used to detect all three independent coordinates of the location of the radiation source with respect to the system. However, it is necessary to consider only the operation of a single 1D sensor to give those skilled in the art an adequate understanding of the operation of this embodiment of the invention.

1D radiation sensing element 1 is a planar, 2D radiation-sensitive position-sensitive element, such as a Texas Instruments TC241 area array CCD image sensor, which is tilted in one plane relative to planar support base 15 by resting element 1 on inclined support 2 (i.e. the plane of element 1 is inclined with respect to base 15 about an axis perpendicular to slits 4). A stationary opaque mask 3 having a plurality of radiation-transmissive slit apertures 4 is supported in parallel alignment relative to base 15, above element 1. Radiation emanating from source 5 passes through slits 4 as planes of radiation 9 (FIG. 3) which cast lines 6 of radiation on element 1 and on base 15.

If the vertical displacement between mask 3 and source 5 is significantly greater than the vertical displacement 18 between mask 3 and base 15, then the spacing 19 between adjacent cast lines 6 will be nearly the same as the spacing 16 between adjacent slits 4. Thus, by making spacings 16 narrower than the width 17 of element 1, one may ensure that at least one line 8 of radiation (a "sensed line") will be cast on and sensed by element 1 whenever radiation is being emitted by source 5. If the mask is planar then slit spacings 16 can be equal; but, if the mask has a non-planar shape, then the slit spacings must be adapted to ensure that at least one radiation line will always be cast on element 1 as source 5 moves about within the intended operational range of the sensor. For example, if the mask is hemi-cylindrical, the slit spacings must decrease as the slits get farther away from the center of the arc of the hemi-cylinder.

FIGS. 2 and 3 show two sensed lines 8, 20 of radiation cast on element 1. If source 5 moves right horizontally, with a component of the movement perpendicular to slits 4, line 20 will gradually move off the left edge of element 1, leaving line 8 on element 1. If source 5 continues to move further to the right, line 8 will eventually also move off the left edge of element 1, but before that happens, another line of radiation will move over the right edge and onto element 1. Thus, if radiation is emanating from source 5, at least one of the resultant lines 6 of radiation is cast upon and sensed by element 1, regardless of whether source 5 is in motion or not.

Because element 1 rests on incline 2, sensed line 8 is skewed with respect to the sides of element 1 whenever the radiation's angle of incidence θ is non-zero. This skew creates a horizontal "slit identification displacement" (SID) between points 8a, 8b at the front and rear ends respectively of sensed line 8 on element 1. Because element 1 is position-sensitive, both SID and the position of point 8a on element 1 can be determined.

The angle θ constitutes one coordinate of the direction of source 5, as viewed from point 8a. In theory, θ can be computed as:

$$\theta = \arctan(SID/HT) \tag{1}$$

where HT (FIG. 3) is the vertical displacement between points 8a and 8b due to inclination of element 1. However, because SID and HT are both comparatively small quantities, computation of θ by means of equation (1) may be error prone, as opposed to the equivalent computation:

$$\theta = \arctan(XD/YD) \tag{2}$$

where XD is the horizontal distance from point 8a to the longitudinal axis of the slit through which the radiation line containing point 8a is cast; and, YD is the vertical distance between point 8a and mask 3. Because XD and YD have significantly greater magnitude than SID and HT, the magnitude of any error introduced through computation by equation (2) will be less than the corresponding error introduced through computation by equation (1).

YD is a constant obtainable by calibration, but XD must be deduced during operation since it varies as a function of the direction of source 5 relative to element 1. Since the distance 24 along the element's front edge to point 8a can be obtained directly from element 1, XD is easily derived by comparing distance 24 with the horizontal displacement PS2 between the same edge of element 1 from which distance 24 is measured and the longitudinal axis of the particular slit through which the radiation line containing point 8a is cast. The latter displacement of each slit relative to element 1 is predetermined by calibration of element 1 and mask 3. But, point 8a may be cast through any one of the plurality of slits 4, so it is necessary to identify the particular slit through which the radiation line containing point 8a is cast. The manner in which this can be done is now explained in relation to FIG. 4.

Figure 4:
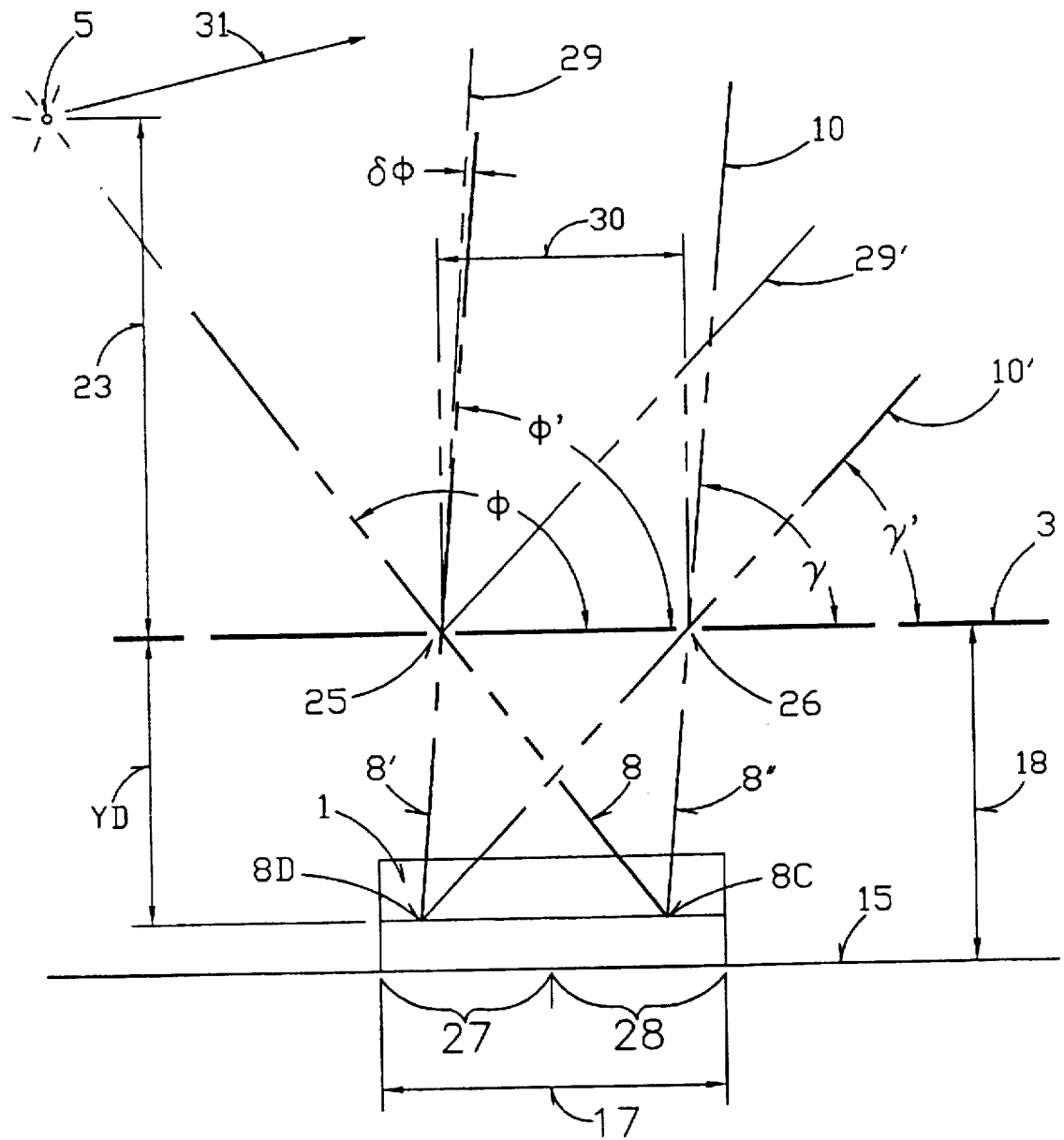
FIG. 4 is another front elevation view of the FIG. 2 sensor, depicting the effect of the traversal of a radiation source relative to the sensor.

FIG. 4 shows the angular range for which radiation passing through two adjacent slits may cast a line on element 1. When source 5 is in the initial position depicted in FIG. 4, radiation line 8 is cast on element 1 through slit 25, such that line 8 intersects the element's front edge at point 8c. As source 5 moves in the direction of arrow 31, line 8 sweeps from right to left across element 1 through an angular range φ-φ', into the location indicated by reference numeral 8', with line 8' now intersecting the element's front edge at point 8d. φ is the angle between line 8 and base 15 (or mask 3); and, φ' is the angle between line 8' and base 15 (or mask 3). If points 8c, 8d were instead cast by radiation passing through slit 26, the incidence angles would be γ and γ' respectively. Parallel reference lines 29, 10 and 29', 10' are also shown in FIG. 4 to facilitate comparison of angles φ, φ', γ and γ'.

It is apparent that angular ranges φ-φ' and γ-γ' are quite distinct. They have only a slight overlap δφ, because source 5 is at a distance 23 from element 1 much greater than slit spacing 16. Therefore, if the angle between base 15 (or mask 3) and a particular radiation line cast upon element 1 does not lie within angular range δφ, then the slit through which that line was cast is immediately identified. If the angle between base 15 (or mask 3) and a particular radiation line cast upon element 1 lies within angular range δφ, the radiation sensed at the element's front edge will be either near point 8d if the radiation was cast through slit 25 (i.e. to cast line 8'); or, near point 8c if the radiation was cast through slit 26 (i.e. to cast line 8"). Points 8d and 8c are widely separated, compared to the width 17 of element 1, and hence are reliably distinguishable from one another, even if the position resolution capability of element 1 is relatively poor. Thus, one robust algorithm for identifying the slit responsible for casting a particular sensed point is as shown in FIG. 5, which should be considered in relation to FIG. 3.

Figure 5:
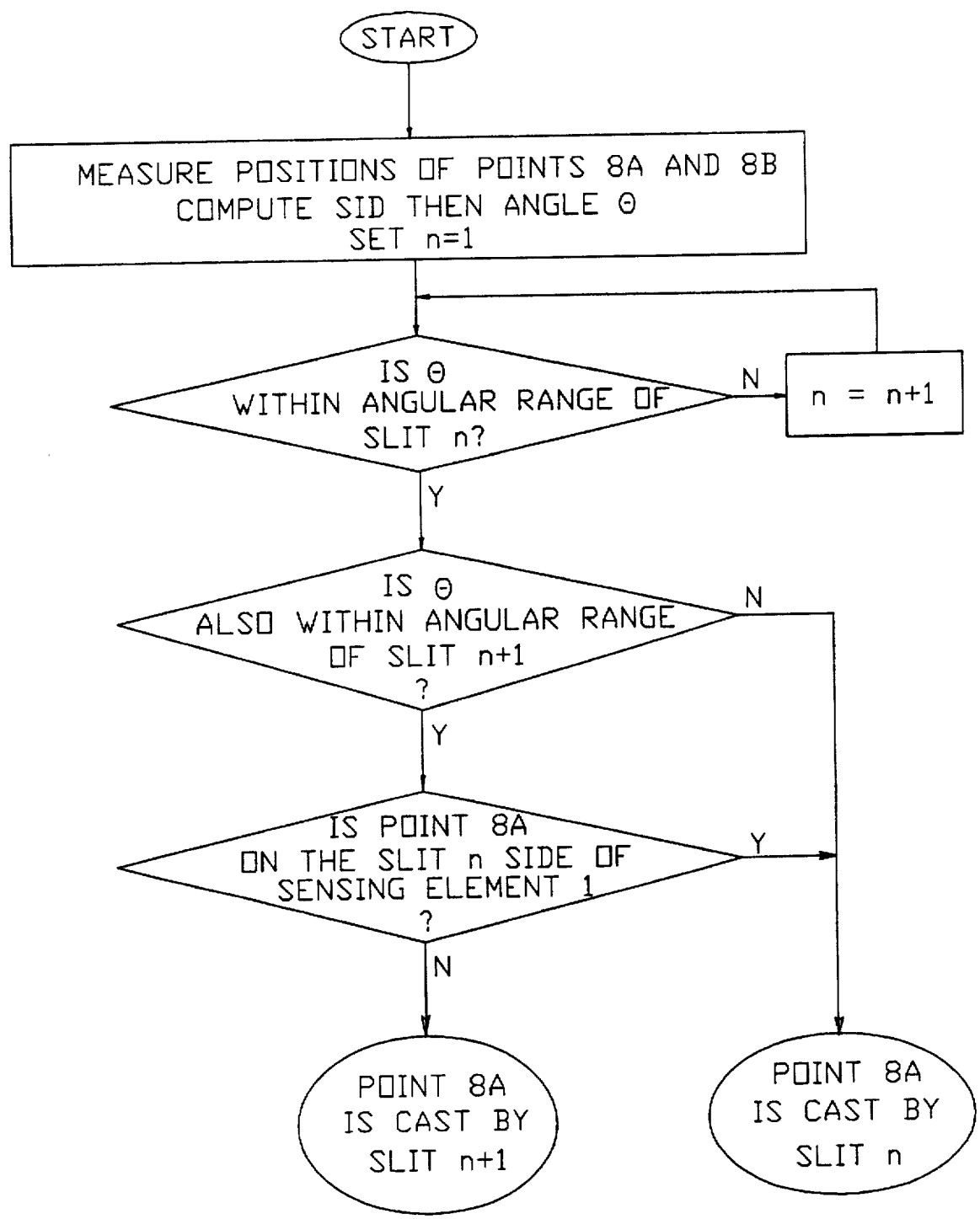
FIG. 5 is a flow chart illustrating an algorithm for distinguishing, within a plurality of slits, one slit through which a line of radiation is cast upon the sensing element of the FIG. 2 sensor.

The angle θ referred to in FIG. 5 can be deduced using equation (1), which requires only the parameter SID, since HT is a constant obtainable by calibration. This implies that slit identification can be accomplished by direct processing of the parameter SID, without determination of the angle θ, thus avoiding the need for explicit application of equation (1). However, it is easier to explain the principle of robust slit identification with reference to the angle θ, than with reference to the parameter SID. Note that it is assumed that all possible measurement errors are taken into consideration in defining, for each slit, the angular range of all possible radiation lines cast upon element 1 through such slit. It is also assumed that element 1 has two independently identifiable sides 27, 28 (FIG. 4).

With reference to FIG. 3, once the displacement 24 of point 8a is determined, and the slit responsible for casting that point is identified, XD can be deduced and the direction coordinate θ can then be computed by applying equation (2). In many applications, θ can be more beneficially specified directly in terms of displacement 24 and the calibrated horizontal displacement PS2 of the relevant slit relative to element 1. In that case, equation (2) need not be applied explicitly, as was explained above for equation (1).

Hereafter, the single one-dimensional radiation source direction coordinate deduced for a particular sensed line is symbolized by two paired values, namely: the horizontal displacement, relative to a reference edge of element 1, of the slit through which that sensed line was cast; and, the horizontal displacement, relative to the same reference edge, of the point at which the sensed line intersects the front edge of the radiation sensitive element. For example, sensed line 8 yields the direction coordinate (PS2, 24).

Although the radiation source direction coordinate can theoretically be deduced solely by reference to the end points 8a, 8b of a single sensed line 8, a small discontinuity in the deduced values may occur if one is forced to shift from one sensed line to another during the deduction process, due to movement of source 5. Obviously, such discontinuity may occur only when two or more lines are cast upon element 1. To overcome this problem and improve accuracy, information characterizing all radiation lines which may possibly be simultaneously cast on element 1 can be combined to provide a continuous function capable of yielding a continuous reading for the direction coordinate. For example, for the situation shown in FIG. 3, one function which will yield a continuous reading for the direction coordinate is:

$$EPS = \frac{PS1 * D2}{D1 + D2} + \frac{PS2 * D1}{D1 + D2} \tag{3}$$

where PSn is the horizontal displacement of slit n relative to the aforementioned reference edge of element 1; and, Dn is the horizontal displacement, relative to center point 1a on the front edge of element 1, of the point at which the sensed line cast through slit n intersects the front edge of the element.

The central region of a given radiation sensitive element usually exhibits that element's best position resolution capability. Equation (3) effectively projects the two front sensed points to the center 1a of element 1, while projecting their corresponding slit positions to the "effective slit position" (EPS) which is basically the weighted sum of the slit positions. The resultant radiation source direction coordinate is (EPS, PC), where PC is the horizontal displacement of the center 1a of element 1, relative to the aforementioned reference edge.

Figure 6:
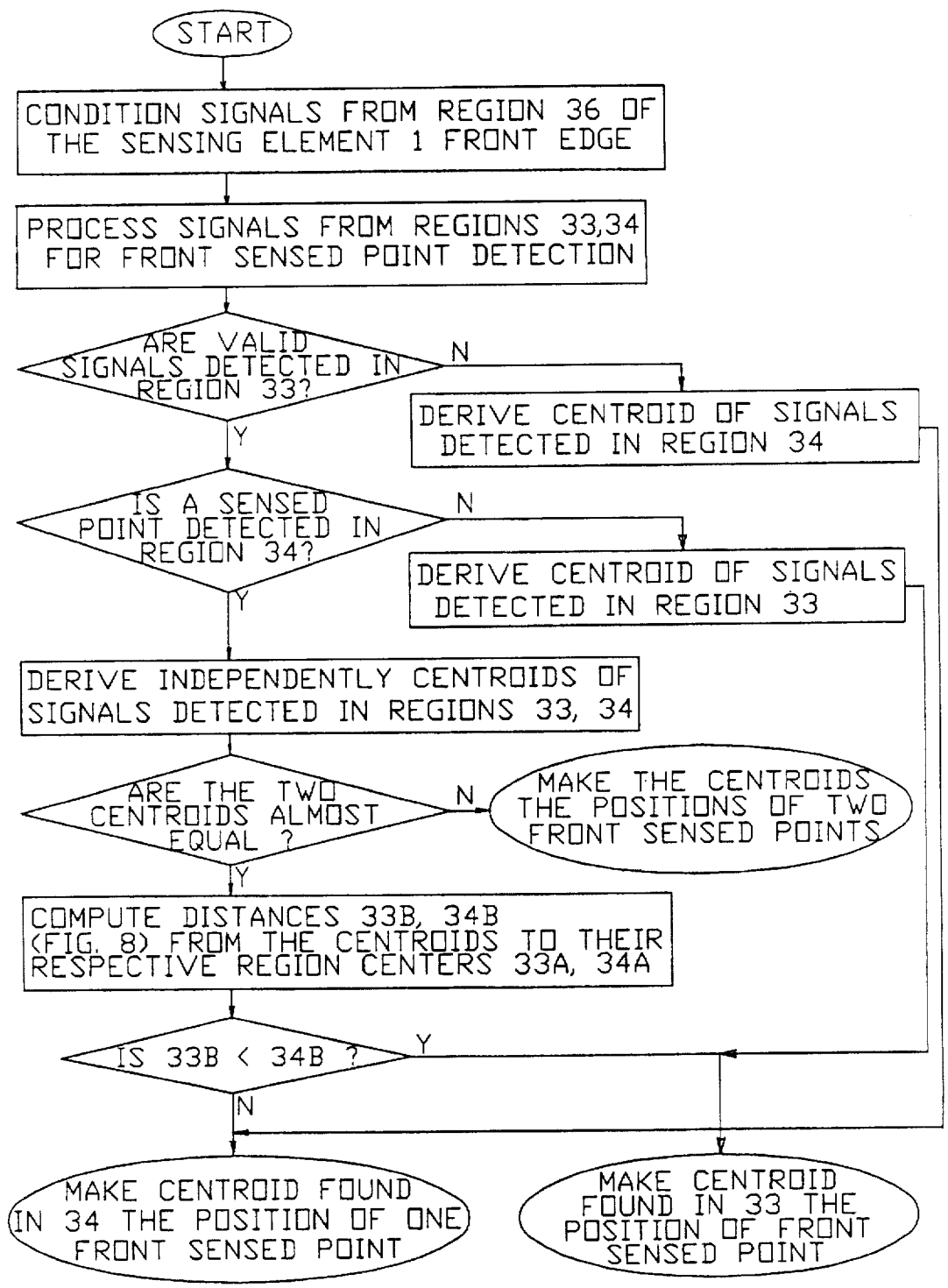
FIG. 6 is a flow chart illustrating an algorithm for determining the point at which a line of radiation intersects the front edge of the sensing element of the FIG. 2 sensor.
Figure 7:
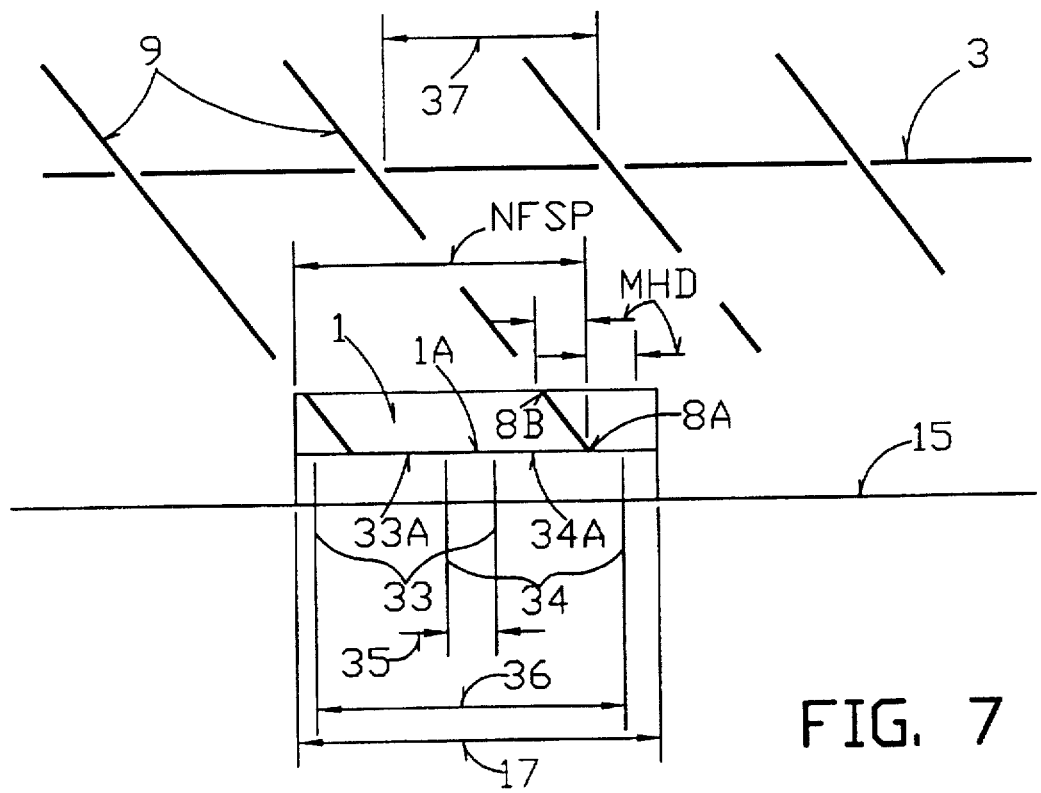
FIG. 7 is another front elevation view of the FIG. 2 sensor, depicting operation of the FIG. 6 algorithm in a situation in which two lines of radiation are cast on the sensing element.
Figure 8:
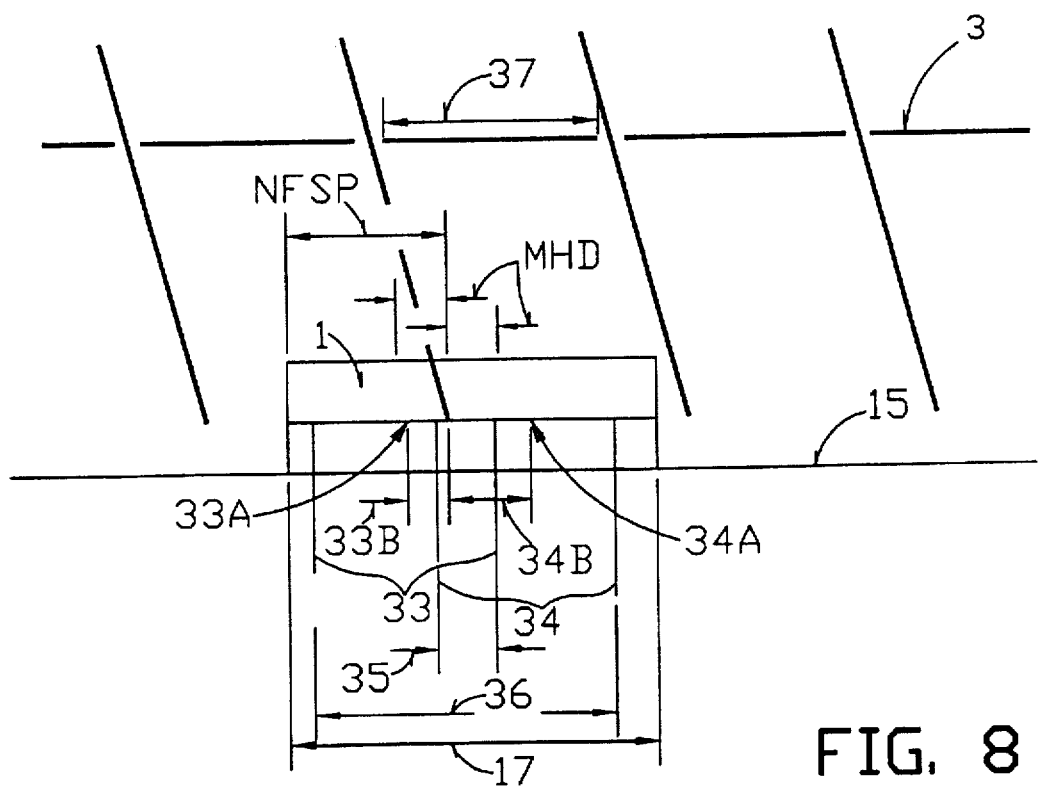
FIG. 8 is another front elevation view of the FIG. 2 sensor, depicting operation of the FIG. 6 algorithm in a situation in which only one line of radiation is cast on the sensing element.

The description of the invention presented thus far assumes that the positions of several sensed points are available. Many different signal processing algorithms can be contrived to obtain these. One algorithm for detecting the front sensed point position(s) is shown in FIG. 6, which makes reference to FIGS. 7 and 8. FIG. 7 depicts the situation in which two cast lines fall on element 1, while FIG. 8 depicts only one cast line. The FIG. 6 algorithm assumes:

a. All signals derived from element 1 are properly conditioned, e.g., filtered, for position sensing purposes.

b. Overlapping front edge segments 33, 34 are of equal width; and, both segments are narrower than the width 37 of the opaque region between the two closest slits, such that in some situations, no radiation will be cast on one of segments 33, 34 depending upon the location of source 5.

c. Points 33a, 34a are respectively the centers of segments 33, 34.

d. The horizontal width of a sensed line is no wider than the overlap 35 between the segments 33, 34.

e. The total width 36 of segments 33 and 34 is large enough to contain two complete sensed lines cast by the two most widely separated adjacent slits on mask 3. Normally, width 36 equals element width 17.

f. The horizontal displacement SID between a rear sensed point, e.g. 8b, and its corresponding front sensed point, e.g. 8a, is no greater than a pre-defined "maximum horizontal displacement" (MHD).

The foregoing assumptions are easily simultaneously satisfied as long as the spacing between the two most widely separated adjacent slits on mask 3 is sufficiently narrower than the width of element 1; and, as long as source 5 remains sufficiently far away from element 1. Together, the assumptions ensure that:

1. At least one of segments 33, 34 will detect a complete front sensed point. The other segment may detect no, a partial or a complete front sensed point.

2. Neither of segments 33, 34 will detect signals from more than one front sensed point.

Once the front sensed point(s) is (are) found, the point nearest the element's center $1a$ can be isolated (i.e. point $8a$ for the situation depicted in FIG. 7). Let the horizontal position of this point be denoted "NFSP". Then, signals in the region from NFSP−MHD to NFSP+MHD on the element's rear edge can be processed (instead of having to process signals from points along the entire rear edge) to find the corresponding rear sensed point. Thus, all required sensed points are found, and the direction coordinate of source 5 deduced as explained above.

It should be clear from the foregoing that a 2D array type radiation sensitive element like that depicted in the drawings is not required to implement the 1D embodiment of the invention. Two 1D sensors may be placed at different vertical distances from slits 4 to simulate the front and rear edges of 2D array element 1. Nevertheless, a 2D sensing element can provide redundant signals which can be used to improve accuracy and resolution. Note also that only the front and rear edge areas of the image captured by a 2D sensor need to be processed to obtain the desired 1D angular orientation information.

Figure 9:
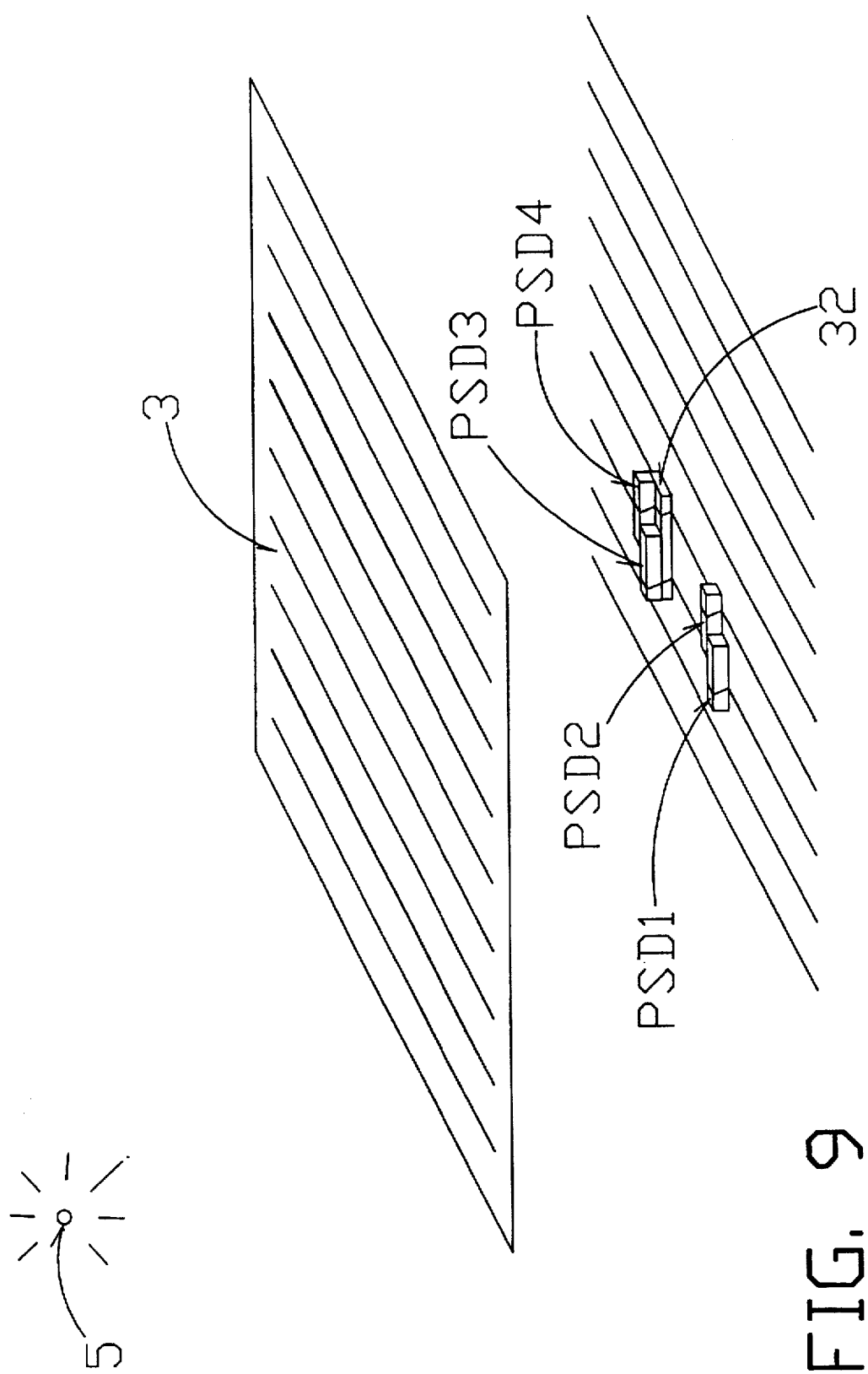
FIG. 9 is an oblique perspective illustration of an alternative one-dimensional sensor embodying the invention.
Figure 10:
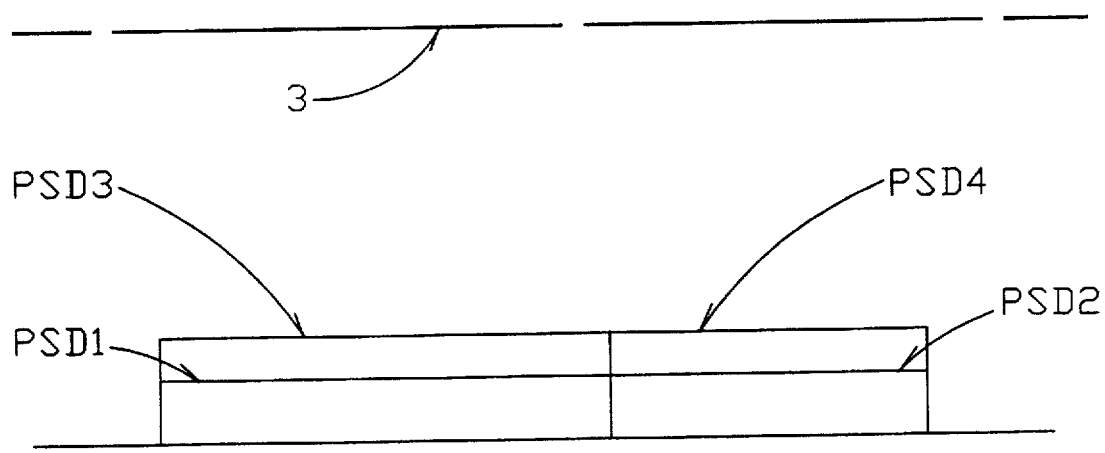
FIG. 10 is an enlarged front elevation view of the FIG. 9 sensor.
Figure 11:
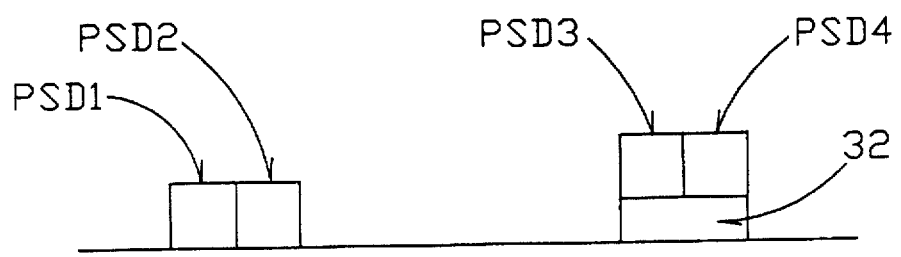
FIG. 11 is an enlarged side elevation view of the FIG. 9 sensor.

While 2D or 1D array type position-sensitive elements can be used as the radiation sensitive element in the above-described 1D embodiment of the invention, non-array type position-sensitive devices, each of which generates only the centroid of all radiation cast on it can also be employed. FIGS. 9, 10 and 11 show one such implementation, employing four 1D position sensitive devices ("PSD") manufactured by Hamamatsu Corporation of Japan and United Detector Technologies of California. The PSDs are grouped in two pairs: front pair PSD1, PSD2; and rear pair PSD3, PSD4, with rear pair PSD3, PSD4 supported on spacer 32. (Like all embodiments of the invention described thus far, the FIG. 9, 10 and 11 embodiment operates in accordance with the first method mentioned above by attempting to sense radiation lines cast on the front and rear PSD pairs at two separate points which are at different vertical displacements relative to mask 3). Several sets of design criteria can be devised to ensure operation of this implementation. The key design objective is to ascertain that at least one PSD in each pair senses one and only one cast line whenever the source 5 is on. One exemplary set of such design criteria is:

1. The length of each PSD is shorter than the spacing between the two closest adjacent slits on mask 3.

2. The total horizontal width covered by each pair of PSDs is greater than the spacing between the two most widely separated adjacent slits on mask 3. The foregoing criteria ensure that each PSD senses either none or at most one cast line; and, that at least one PSD in each pair senses one cast line whenever source 5 is on.

Figure 12:
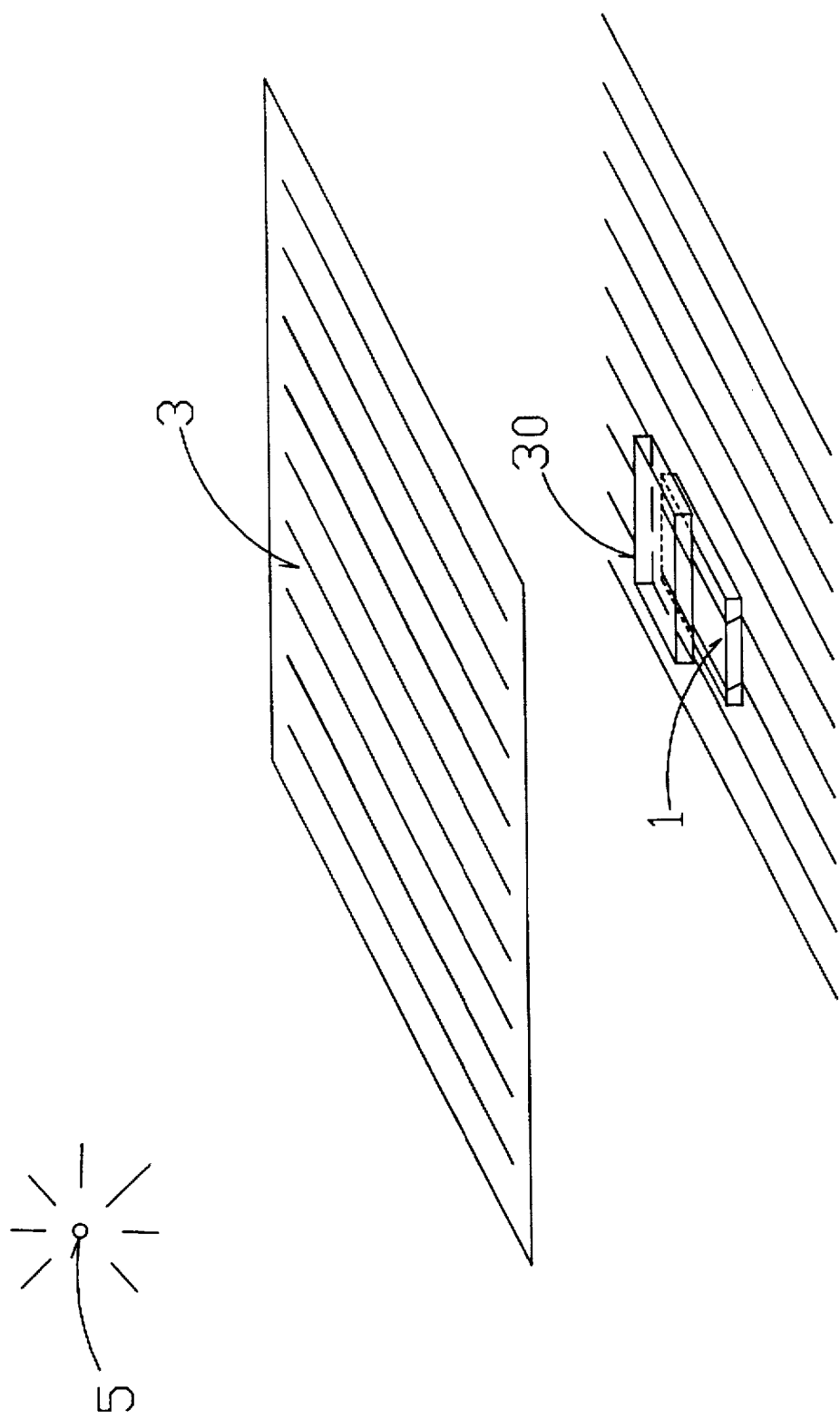
FIG. 12 is an oblique perspective illustration of another alternative one-dimensional sensor embodying the invention.
Figure 13:
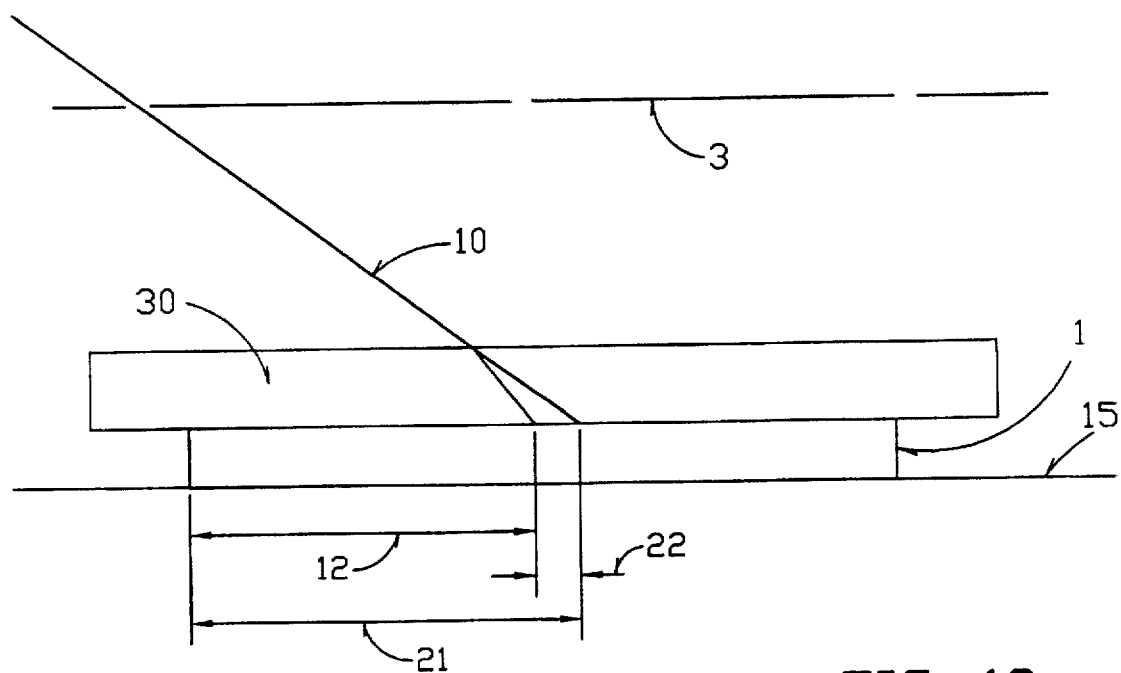
FIG. 13 is an enlarged front elevation view of the FIG. 12 sensor.
Figure 14:
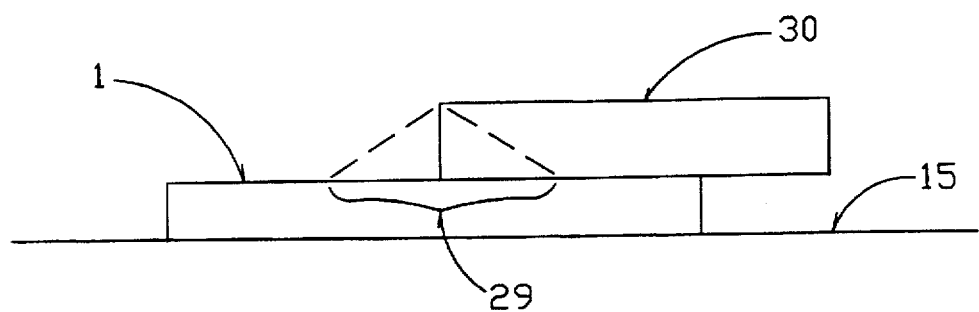
FIG. 14 is an enlarged side elevation view of the FIG. 12 sensor.

Inclined support 2 is but one mechanism for skewing sensed line 8 with respect to the sides of element 1 in order to facilitate identification of the slit through which line 8 is cast, even if a 2D radiation sensitive element is used. As an alternative, one may, as shown in FIGS. 12, 13 and 14, expose the desired information by covering either the front or the rear edge of element 1 with a piece of radiation-transmissive material 30 which deflects incident radiation by an amount dependent on the angle of incidence. For example, if source 5 radiates visible light, deflector 30 may be a piece of flat high-index glass. Deflector 30 must be positioned such that its potential shadow region 29 (FIG. 14) does not overlap on the sensitive front and rear edge regions of element 1.

As shown in FIG. 13, deflector 30 causes sensed line 10 to intersect the front edge of element 1 at position 21 and intersect the rear edge of element 1 at position 12. The difference between positions 12 and 21 (i.e. displacement 22) depends on the index of refraction of deflector 30, which is a constant; and, on the angle a at which sensed line 10 is incident upon deflector 30. Determination of displacement 22 facilitates derivation of the angle of incidence $\alpha$, which can in turn be used to identify the slit casting line 10, in a manner similar to that described above in relation to angle $\theta$ and the sensor shown in FIG. 2.

Multiple slit aperture mask 3 can be made by many different methods. For example, if source 5 radiates visible light, well known photolithographic and chemical processes can be employed to etch slits 4 on a metal-deposited glass substrate. Mask 3 need not be flat, but slits 4 should be parallel and should have straight, well-defined edges.

2D Sensors According to the First Method

Figure 15:
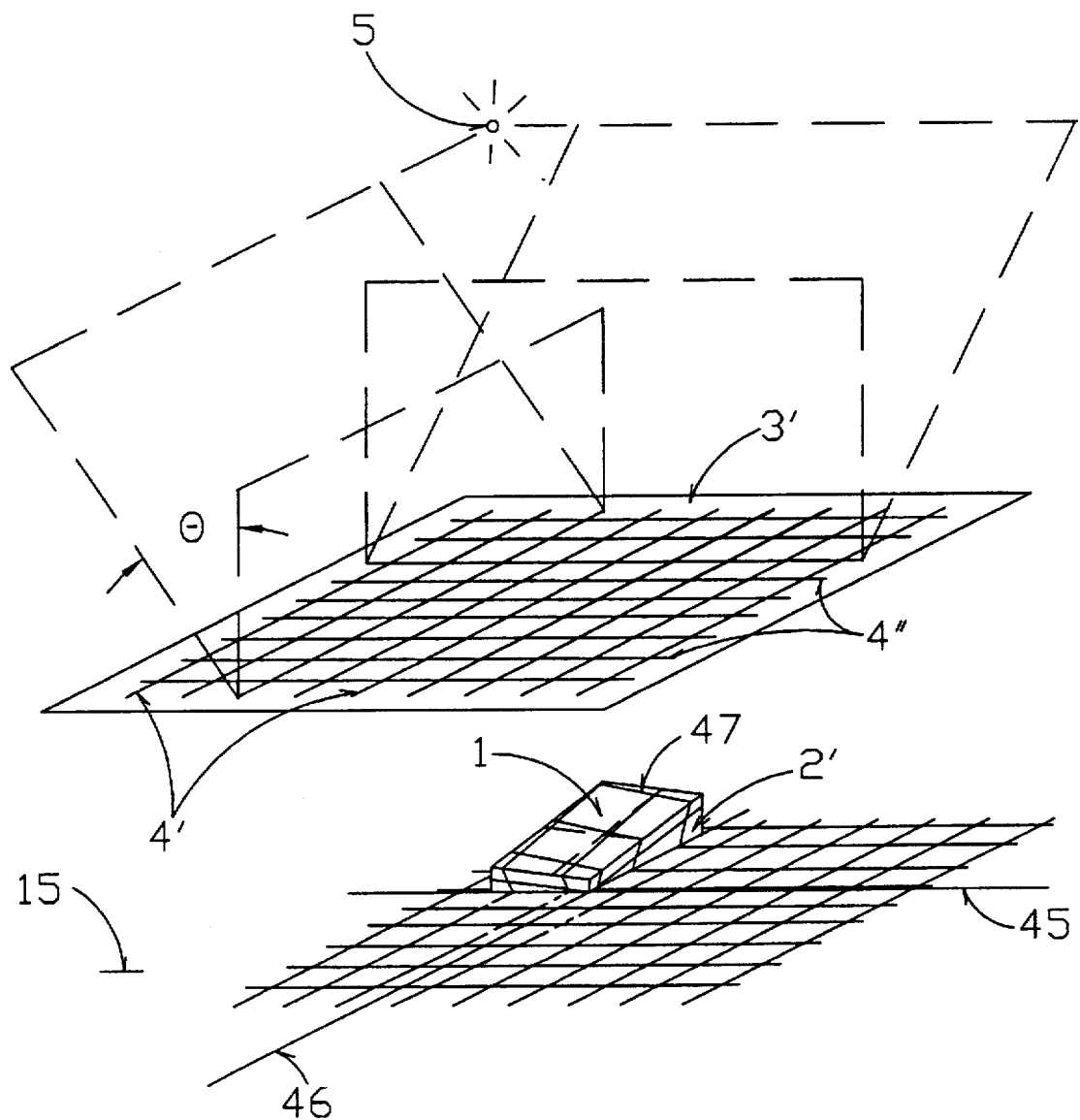
FIG. 15 is an oblique perspective illustration of a two-dimensional sensor constructed in accordance with the present invention.

A 2D sensor capable of sensing two one-dimensional coordinates of the angular orientation of a radiation source relative to the sensor can be constructed by adding a second dimension to a 1D sensor. One way of doing this is to provide a second plurality of slit apertures on the mask, at right angles to the slit apertures described above for the 1D sensor; and, if the 1D sensor's sensing element is a 1D element, substituting a 2D element for the 1D element. FIG. 15 shows one such 2D embodiment of the invention. Note that, whereas the 1D sensor of FIG. 2 is inclined about only one axis relative to support base 15, support 2' inclines the 2D sensing element of FIG. 15 about two mutually perpendicular axes 45, 46. Also note the two sets of mutually perpendicular slits 4', 4" on mask 3'.

Recall that for the 1D sensor of FIG. 2, points sensed at just the front and rear edges of element 1 (i.e. points in just the front and rear rows of pixels of an array type radiation sensitive element) are theoretically sufficient for deduction of the desired 1D radiation source direction coordinate. But, for the 2D sensor of FIG. 15, signals derived from additional rows of pixels must be processed simply to deduce the same 1D radiation source direction coordinate. This is because a radiation line 47 cast through one of the additional slits 4" may be incident over a large portion of element 1's front or rear pixel rows, obscuring the points at which radiation lines cast through slits 4' intersect the element's front or rear pixel rows. To overcome this problem, signals derived from additional rows of pixels (typically, rows near the edges of element 1) can be processed to isolate the element edge-incidence points of radiation lines cast through either of slits 4' or 4". It can thus be seen that the signal processing effort required to deduce the 2D direction coordinates of source 5 relative to a 2D sensor will typically be more than double the effort required to deduce the 1D direction coordinate for a 1D sensor.

Figure 16:
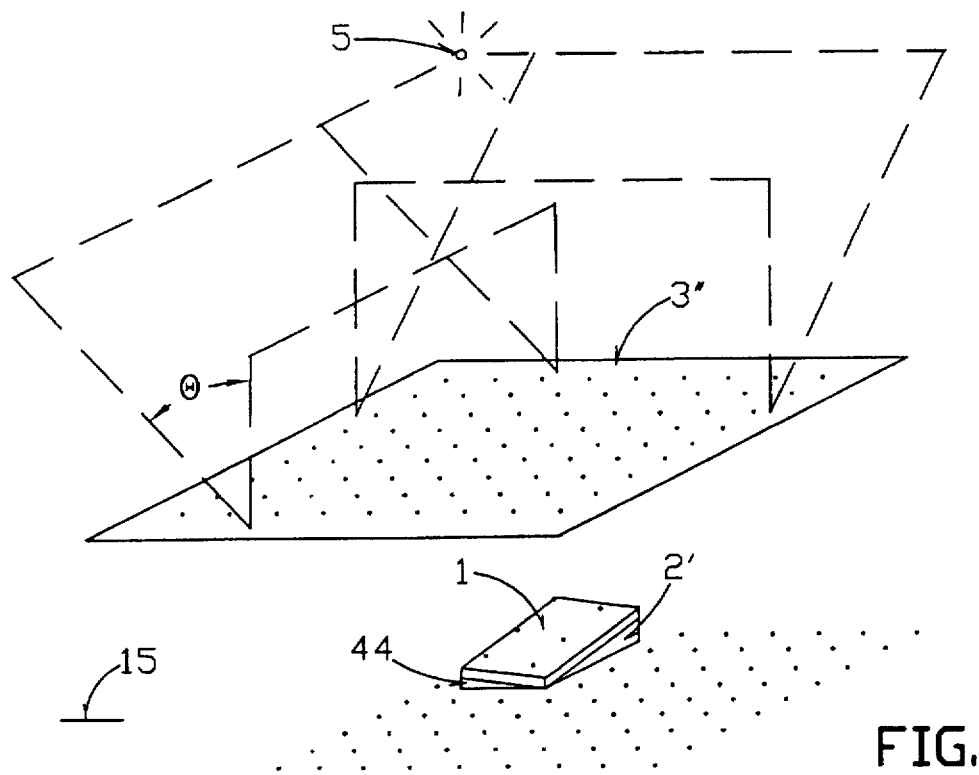
FIG. 16 is an oblique perspective illustration of an alternative two-dimensional sensor embodying the invention.
Figure 17:
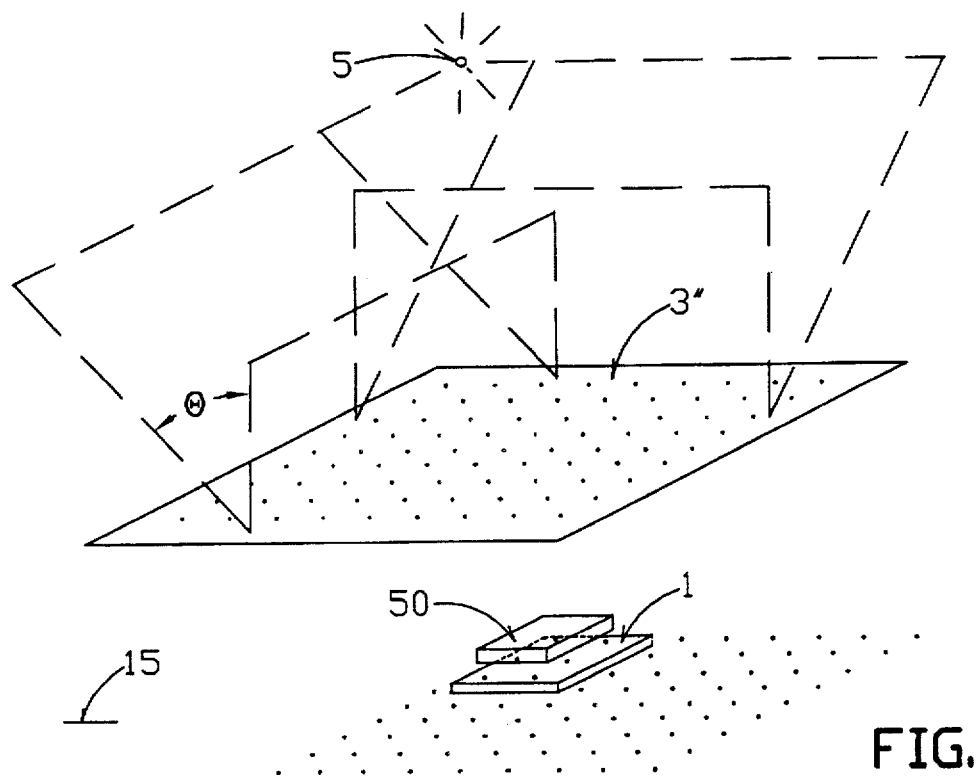
FIG. 17 is an oblique perspective illustration of another alternative two-dimensional sensor embodying the invention.

To minimize the signal processing effort required for a 2D sensor, slits 4', 4" can be replaced by pinholes located at the intersections of the original slits. FIGS. 16 and 17 depict two embodiments of such sensors, either of which results in radiation spots, instead of lines, being cast onto element 1. In particular, FIG. 16 shows how the 2D sensor of FIG. 15 can be reconstructed with pinholes substituted for slits 4', 4"; and, FIG. 17 shows a 2D version of the 1D sensor of FIG. 12 reconstructed with a pinhole mask 3" and a high index cover 50 overlying one quadrant of element 1. The position of each cast radiation spot carries partial information respecting not one but two angles characteristic of the orientation of source 5 relative to the sensor. It is sufficient to sense the locations of as few as three such spots cast by three pinholes aligned at the vertices of a right triangle in order to deduce two one-dimensional coordinates of the angular orientation of source 5 relative to the sensor.

Compared to sensors with pinhole masks, sensors having slit masks have the advantage that the radiation lines cast on the sensing element carry more redundant information respecting the radiation source angles. This redundant information can be utilized to improve the sensor's resolution and accuracy. 2D sensors having slit aperture masks can also be formed from a number of 1D sensors (i.e. having 1D radiation sensing elements) at an overall cost less than that of a sensor having a 2D array type radiation sensing element. Conversely, signals derived from a 2D sensor having a pinhole mask are easier to process, although such sensors require a 2D array type sensing element which is more expensive than a 1D type sensing element.

1D and 2D Sensors According to the Second Method

Each of the above-described sensors utilize the first method mentioned above to detect one or two one-dimensional components of the angular orientation of a point radiation source relative to the sensor, by attempting to sense radiation cast at points which are at effectively different vertical displacements relative to a mask. In other words, sensors which utilize the first method require two vertically distinct sensing planes, which may be achieved by mechanical inclination of a single sensing element, by displacing discrete sensing elements relative to one another, or by covering a portion of the sensing element with a high refractive index cover. (For sensors having a refractive cover, the sensing plane beneath the cover is notionally "vertically displaced" relative to the mask by an amount dependent upon the refractive index of the cover material and the angle of radiation's incidence.) Although workable, these requirements may in some situations make it impractical to inexpensively fabricate and/or calibrate a sensor in accordance with the first method.

Figure 18:
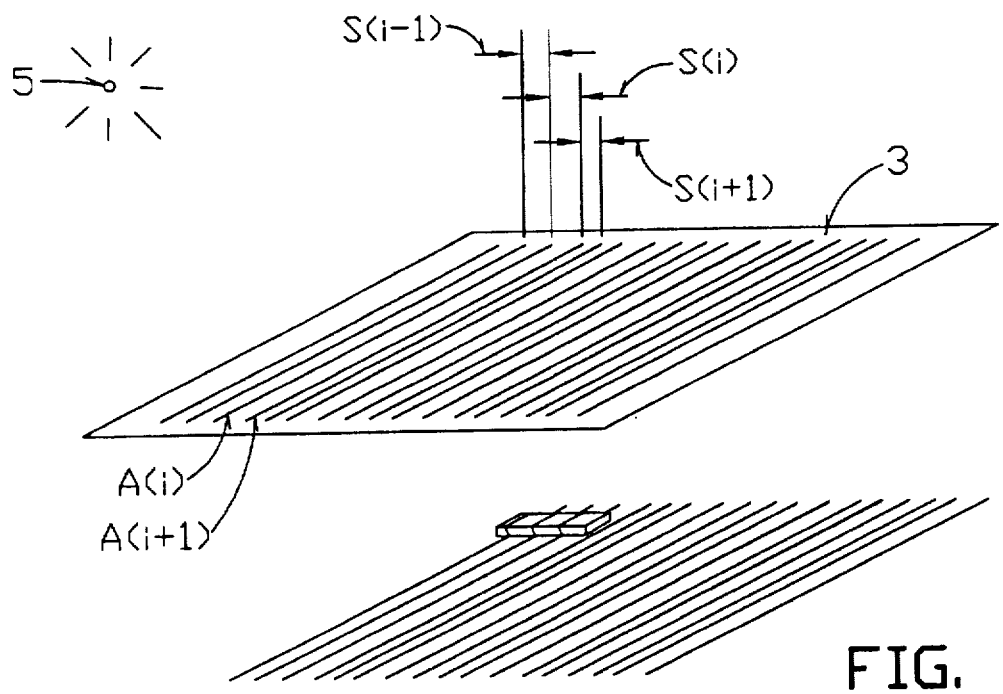
FIG. 18 is an oblique perspective illustration of a one-dimensional sensor embodying the invention in conjunction with a coded aperture mask.
Figure 19:
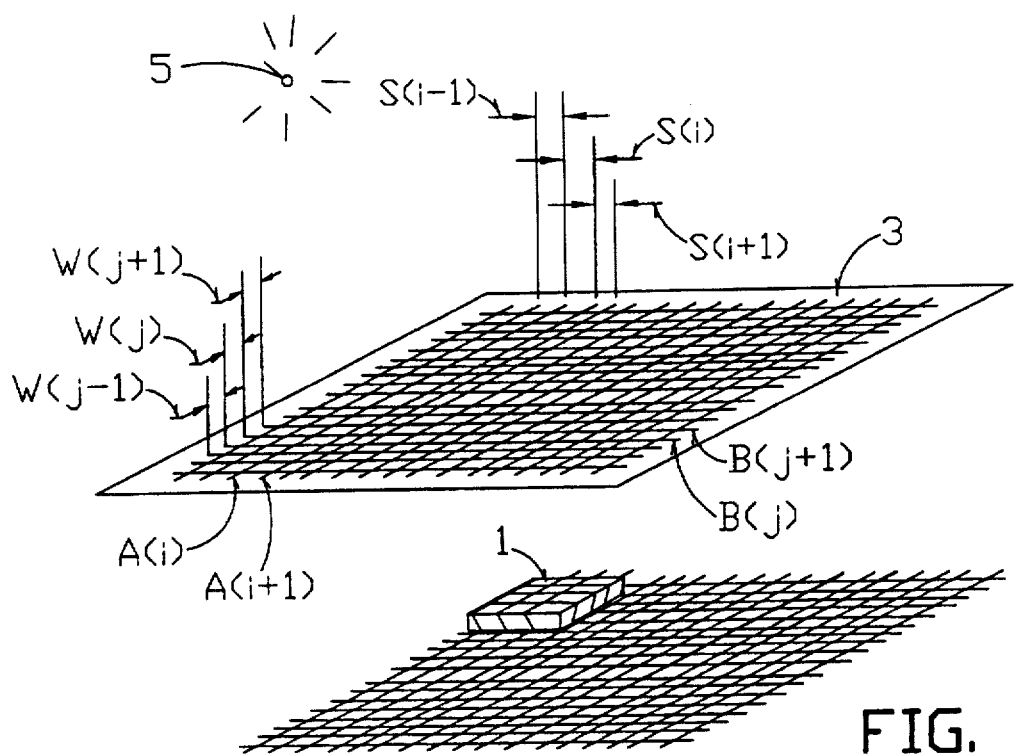
FIG. 19 is an oblique perspective illustration of a two-dimensional sensor embodying the invention in conjunction with a coded aperture mask.
Figure 20:
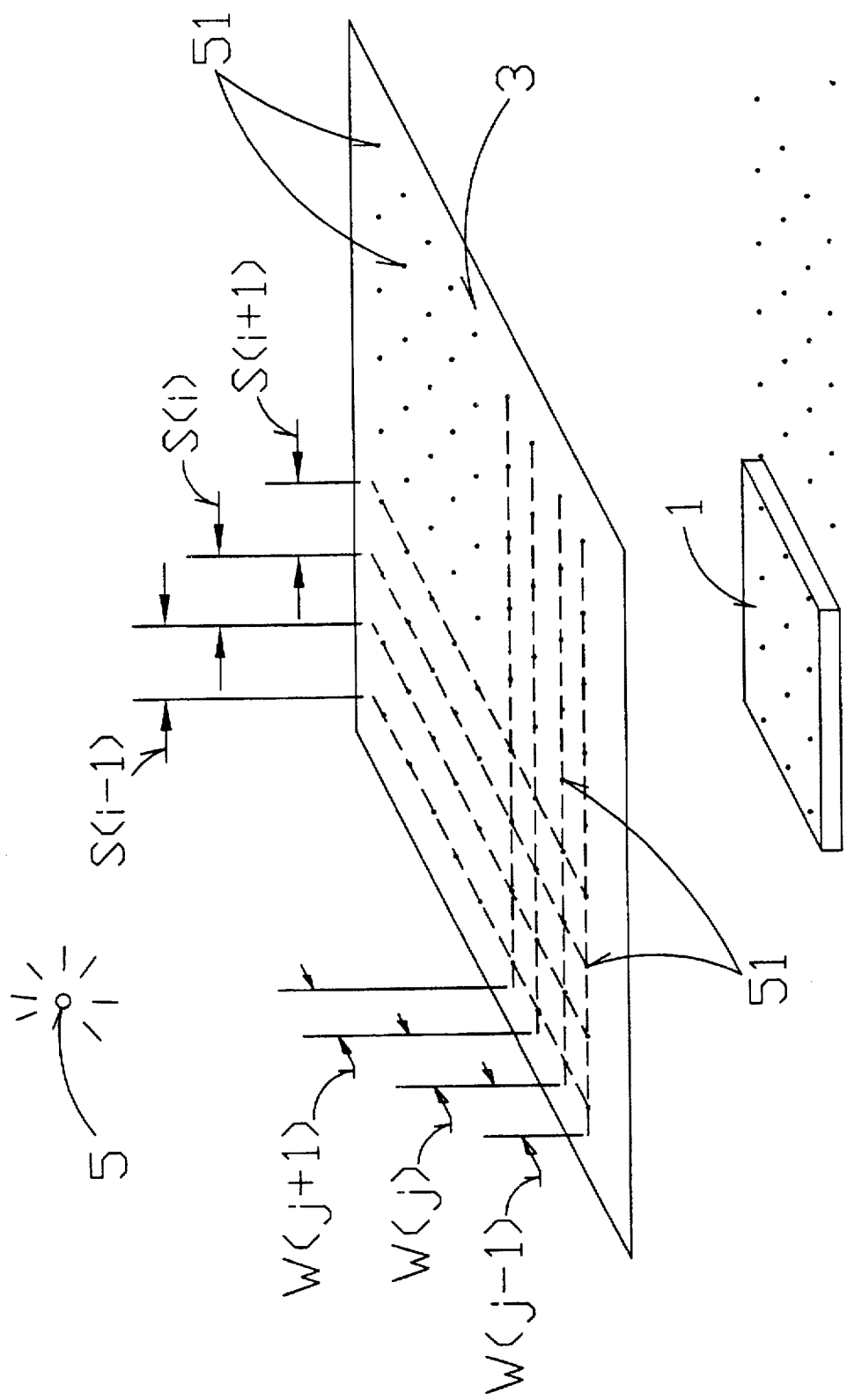
FIG. 20 is an oblique perspective illustration of another two-dimensional sensor embodying the invention in conjunction with a coded aperture mask.

It will be recalled that the problem is to identify a particular aperture through which radiation is cast on the sensing element. An alternative solution (i.e. the second method) is to provide a mask in which unique aperture information is "coded" by providing different ratios of the inter-aperture spacings. This makes it possible to construct a 1D or 2D sensor by simply placing the radiation sensing element(s) on a single sensing plane aligned parallel to the apertured mask. FIG. 18 shows a 1D sensor constructed to operate in accordance with the second method, where:

$$\frac{S(i-1)}{S(i)} \neq \frac{S(i)}{S(i+1)} \tag{4}$$

where "S(i)" is the spacing between apertures a(i) and a(i+1) and the apertures are numbered consecutively. FIGS. 19 and 20 show two different 2D embodiments of sensors having coded aperture masks; the FIG. 19 embodiment utilizing a slit aperture mask and the FIG. 20 embodiment utilizing a pinhole aperture mask. In both of these embodiments the aperture spacing ratios are given by:

$$\frac{S(i-1)}{S(i)} \neq \frac{S(i)}{S(i+1)} ; \tag{5}$$

$$\frac{W(j-1)}{W(j)} \neq \frac{W(j)}{W(j+1)}$$

where "W(j)" is the spacing between cross-directional apertures b(j) and b(j+1) and the apertures are numbered consecutively.

The reason for coding the unique aperture identification information within the ratios of adjacent aperture spacings, rather than within the aperture spacings themselves is because the ratios are invariant relative to the distance between the sensor and the radiation source, which can change as the radiation source moves about within the intended operational space of the sensor. Unfortunately, this necessitates simultaneous sensing of at least three points of incidence of the radiation on the sensing elements(s) for a 1D sensor, and at least five points for a 2D version, in order to uniquely identify the aperture(s) through which a particular sensed point is cast.

As is well known, if the smallest dimension of a light-sensing aperture becomes too small, light transmitted through the aperture loses its straight line travel property. Because this could impair the angle sensing accuracy and resolution capability of sensors constructed in accordance with the invention, the width of a slit aperture or the diameter of a pinhole aperture, as well as the inter-spacings between apertures, must not be too small. This, and the need for at least three independent sensed points for a 1D sensor utilizing the second method (or five points for a 2D sensor utilizing the second method), implies that the sensing element(s) of sensors utilizing the second method must generally be larger than those of sensors which utilize the first method. The mask of a second method sensor will also be more complicated to design than that of a first method sensor, particularly if one attempts to provide a large number of apertures on one mask to improve resolution and/or accuracy. These factors must be traded off in determining whether sensors constructed in accordance with either of the first or second methods are best suited to a particular application.

As will be apparent to those skilled in the art in the light of the foregoing disclosure, many alterations and modifications are possible in the practice of this invention without departing from the spirit or scope thereof. For example, instead of a mask having parallel aligned slit apertures or pinhole apertures, one may use a mask having parallel rows of any desired combination of longitudinally aligned radiation-transmitting slit and/or pinhole apertures. Such rows need only be spaced relative to one another, and the mask aligned relative to the radiation sensing element, so as to cast the "sensed points" required to deduce the desired angle information. In the claims which follow, masks with the desired rows of slit and/or pinhole apertures are characterized as having a "plurality of parallel rows of one or more longitudinally aligned, narrow width apertures". Accordingly, the scope of the invention is to be construed in accordance with the substance defined by the following claims.

What is claimed is:

1. A sensor for determining a one-dimensional component of the angular orientation of a radiation source relative to said sensor, comprising:
    (a) a radiation sensitive element for producing an electrical signal representative of radiation incidence upon said element;
    (b) a radiation-opaque mask mounted between said element and said radiation source, said mask having a first plurality of parallel rows of one or more longitudinally aligned, narrow width apertures;

wherein:
    (i) said rows of apertures are spaced relative to one another, and said element is aligned relative to said mask, such that radiation emitted by said source through at least one of said rows of apertures is simultaneously incident upon at least two independent radiation-sensitive points on said element while said source is within an intended operational range of said sensor; and,
    (ii) said points are displaced from said one of said rows of apertures by different distances.

2. A sensor as defined in claim 1, wherein said rows of apertures lie in a first plane.

3. A sensor as defined in claim 2, wherein said rows of apertures are equally spaced.

4. A sensor as defined in claim 1, wherein said parallel rows of apertures lie in a symmetric rectilinear surface shaped to intersect a plurality of planes perpendicularly, said planes extending from a radiation sensitive point on said element through said rows of apertures.

5. A sensor as defined in claim 4, wherein:

(a) said surface is hemi-cylindrical; and, (b) adjacent rows of said apertures on said surface are spaced apart by amounts which vary in inverse proportion to distance along said surface between said adjacent rows and an arc centre of said surface.

6. A sensor as defined in claim 1, wherein said radiation source is a point light source, and said radiation sensitive element is a position sensitive photo-sensor.

7. A sensor as defined in claim 1, wherein:

(a) said radiation sensitive element comprises first and second radiation sensitive segments respectively extending in separate, non-intersecting planes which do not intersect said mask; and, (b) at least one of said points is on said first segment and at least one of said points is on said second segment.

8. A sensor as defined in claim 1, wherein said element lies in a plane inclined with respect to said rows of apertures about an axis perpendicular to said rows of apertures.

9. A sensor as defined in claim 8, wherein:

(a) said element comprises first and second non-intersecting, radiation sensitive segments; and, (b) at least one of said points is on said first segment and at least one of said points is on said second segment.

10. A sensor as defined in claim 7, wherein said parallel rows of apertures lie in a symmetric rectilinear surface shaped to intersect a plurality of planes perpendicularly, said planes extending from a radiation sensitive point on said element through said rows of apertures.

11. A sensor as defined in claim 10, wherein adjacent rows of said apertures on said surface are spaced apart by amounts which vary in inverse proportion to distance along said surface between said adjacent rows and an arc centre of said surface.

12. A sensor for determining a one-dimensional component of the angular orientation of a radiation source relative to said sensor, comprising:

(a) a radiation sensitive element for producing an electrical signal representative of radiation incidence upon said element;

(b) a radiation-opaque mask mounted between said element and said radiation source, said mask having a first plurality of parallel rows of one or more longitudinally aligned, narrow width apertures;

(c) a high refractive index cover overlying at least a portion of said element;

wherein:

(i) said element lies in a plane parallel to said rows of apertures and separated from said mask;

(ii) said element and said cover are aligned, relative to said mask, such that radiation emitted by said source through at least one of said rows of apertures is simultaneously incident upon at least two independent radiation-sensitive points on said element while said source is within an intended operational range of said sensor;

(iii) at least one of said points is under said cover; and, (iv) at least one of said points is not under said cover.

13. A sensor as defined in claim 12, wherein said parallel rows of apertures lie in a symmetric rectilinear surface shaped to intersect a plurality of planes perpendicularly, said planes extending from a radiation sensitive point on said element through said rows of apertures.

14. A sensor as defined in claim 13, wherein adjacent rows of said apertures are spaced apart by amounts which vary in inverse proportion to distance along said surface between said adjacent rows and an arc centre of said surface.

15. A sensor for determining two one-dimensional components of the angular orientation of a radiation source relative to said sensor, comprising:

(a) a radiation sensitive element for producing an electrical signal representative of radiation incidence upon said element;

(b) a radiation-opaque mask mounted between said element and said radiation source, said mask having a first plurality of parallel rows of one or more longitudinally aligned, narrow width apertures lying in a first plane and, a second plurality of parallel rows of one or more longitudinally aligned, narrow width apertures lying in said first plane and extending perpendicular to said first plurality of rows of apertures;

wherein:

(i) said element lies in a second plane inclined with respect to said first plane about an axis perpendicular to said first plurality of rows of apertures and further inclined with respect to an axis perpendicular to said second plurality of rows of apertures;

(ii) said first plurality of rows of apertures are spaced relative to one another, said second plurality of rows of apertures are spaced relative to one another, and said element is aligned relative to said mask, such that:

(A) radiation emitted by said source through at least one of said first plurality of rows of apertures is simultaneously incident upon at least two independent radiation-sensitive first points on said element while said source is within an intended operational range of said sensor;

(B) radiation emitted by said source through at least one of said second plurality of rows of apertures is simultaneously incident upon at least two independent radiation-sensitive second points on said element while said source is within an intended operational range of said sensor;

(iii) said first points are displaced from said one first plurality row by different distances; and, (iv) said second points are displaced from said one second plurality row by different distances.

16. A sensor for determining two one-dimensional components of the angular orientation of a radiation source relative to said sensor, comprising:

(a) a radiation sensitive element lying in a first plane, said element notionally divided into four quadrants by first and second mutually perpendicular axes, said element for producing an electrical signal representative of radiation incidence upon said element;

(b) a radiation-opaque mask mounted between said element and said radiation source, said mask having a first plurality of parallel rows of one or more longitudinally aligned, narrow width apertures extending parallel to said first axis and lying in a second plane, and a second plurality of parallel rows of one or more longitudinally aligned, narrow width apertures extending perpendicular to said first plurality of rows of apertures;

(c) a high refractive index cover overlying at least one of said quadrants;

wherein:

(i) said first and second planes are parallel;

(ii) said first plurality of rows of apertures are spaced relative to one another and said element is aligned relative to said mask, such that radiation emitted by said source through at least one of said first plurality of rows of apertures is simultaneously incident upon at least two independent radiation-sensitive first points on said element while said source is within an intended operational range of said sensor, with at least one of said first points under said cover and at least one of said first points not under said cover; and, (iii) said second plurality of rows of apertures are spaced relative to one another and said element is further aligned relative to said mask, such that radiation emitted by said source through at least one of said second plurality of rows of apertures is simultaneously incident upon at least two independent radiation-sensitive second points on said element while said source is within an intended operational range of said sensor, with at least one of said second points under said cover and at least one of said second points not under said cover.

17. A sensor for determining two one-dimensional components of the angular orientation of a radiation source relative to said sensor, comprising:

(a) first and second radiation sensitive elements respectively lying in first and second non-intersecting planes, said elements for producing electrical signals representative of radiation incidence upon said respective elements;

(b) a radiation-opaque mask mounted between said elements and said radiation source, said mask having a first plurality of parallel rows of one or more longitudinally aligned, narrow width apertures lying in a third plane not interesecting said first or second planes, and a second plurality of parallel rows of one or more longitudinally aligned, narrow width apertures lying in said third plane and extending perpendicular to said first plurality of rows of apertures;

wherein:

(i) said first and second planes are separated from said third plane by different distances;

(ii) said first plurality of rows of apertures are spaced relative to one another and said elements are aligned relative to said mask, such that radiation emitted by said source through at least one of said first plurality of rows of apertures is simultaneously incident upon at least two independent radiation-sensitive first points while said source is within an intended operational range of said sensor, with at least one of said first points on said first element and at least one of said first points on said second element; and, (iii) said second plurality of rows of apertures are spaced relative to one another and said element are further aligned relative to said mask, such that radiation emitted by said source through at least one of said second plurality of rows of apertures is simultaneously incident upon at least two independent radiation-sensitive second points while said source is within an intended operational range of said sensor, with at least one of said second points on said first element and at least one of said second points on said second element.

18. A sensor for determining a one-dimensional component of the angular orientation of a radiation source relative to said sensor, comprising:

(a) a radiation sensitive element lying in a first plane, said element for producing an electrical signal representative of radiation incidence upon said element;

(b) a radiation-opaque mask mounted between said element and said radiation source, said mask having a plurality of parallel rows of one or more longitudinally aligned, narrow width apertures lying in a second plane;

wherein:

(i) said first plane is parallel to said rows of apertures;

(ii) said element is aligned relative to said mask, and adjacent ones of said rows of apertures are separated, such that radiation emitted by said source through at least three adjacent ones of said rows of apertures is simultaneously incident upon at least three independent radiation-sensitive points on said element while said source is within an intended operational range of said sensor; and, (iii) for any adjacent three of said rows of apertures, the ratio of:

(A) distance between a first outward and a central one of said three rows; to, (B) distance between a second outward and said central one of said three rows;

is different than said ratio for any other adjacent three of said rows.

19. A sensor for determining two one-dimensional components of the angular orientation of a radiation source relative to said sensor, comprising:

(a) a radiation sensitive element lying in a first plane, said element for producing an electrical signal representative of radiation incidence upon said element;

(b) a radiation-opaque mask mounted between said element and said radiation source, said mask having a first plurality of parallel rows of one or more longitudinally aligned, narrow width apertures lying in a second plane and, a second plurality of parallel rows of one or more longitudinally aligned, narrow width apertures lying in said first plane and extending perpendicular to said first plurality of rows of apertures;

wherein:

(i) said first and second planes are parallel;

(ii) said element is aligned relative to said mask, and adjacent ones of said first plurality of rows of apertures are separated, such that radiation emitted by said source through at least three adjacent ones of said first plurality of rows of apertures is simultaneously incident upon at least three independent radiation-sensitive first points on said element while said source is within an intended operational range of said sensor;

(iii) said element is further aligned relative to said mask, and adjacent ones of said second plurality of rows of apertures are separated, such that radiation emitted by said source through at least three adjacent ones of said second plurality of rows of apertures is simultaneously incident upon at least three independent radiation-sensitive second points on said element while said source is within an intended operational range of said sensor;

(iv) for any adjacent three of said first plurality of rows of apertures, the ratio of:
  (A) distance between a first outward and a central one of said three first plurality rows; to,
  (B) distance between a second outward and said central one of said three first plurality rows;
  is different than said ratio for any other adjacent three of said first plurality rows; and,
(v) for any adjacent three of said second plurality of rows, the ratio of:
  (A) distance between a first outward and a central one of said three second plurality rows; to,
  (B) distance between a second outward and said central one of said three second plurality rows;
  is different than said ratio for any other adjacent three of said second plurality rows.

20. A method of identifying, within a plurality of parallel rows of one or more longitudinally aligned, narrow width apertures in a radiation-opaque mask separating a radiation source from a reference plane, one of said rows through which radiation emitted by said source is incident upon at least two independent points on a radiation sensitive element positioned between said mask and said reference plane, said points at different distances from said reference plane, said method comprising the steps of:
  (a) for each one of said rows, predetermining a range of angles for which radiation emitted by said source passes through said one row and is incident upon said element;
  (b) for any two of said points:
    (i) deriving an angle θ=arctan(SID/HT) where SID is the distance vector between said points in a direction parallel to said reference plane and perpendicular to said rows of apertures, and HT is the distance vector between said points in a direction perpendicular to said reference plane;
    (ii) comparing said deduced angle θ with said predetermined range of angles; and,
    (iii) selecting, as said one row through which radiation emitted by said source is incident upon said element, that one of said rows for which said predetermined range of angles contains said deduced angle θ.

21. A method of identifying, within a plurality of parallel rows of one or more longitudinally aligned, narrow width apertures in a radiation-opaque mask separating a radiation source from a reference plane, one of said rows through which radiation emitted by said source is incident upon at least two independent points on a radiation sensitive element positioned between said mask and said reference plane, said method comprising the steps of:
  (a) for each one of said rows, predetermining a range of values of distance vectors in a direction parallel to said reference plane and perpendicular to said rows of apertures for which radiation emitted by said source passes through said one row and is incident upon said element; and,
  (b) for any two of said points:
    (i) deriving the distance vector between said points in a direction parallel to said reference plane and perpendicular to said rows;
    (ii) comparing said derived distance vector with said predetermined range of values; and,
  (c) selecting, as said one row through which radiation emitted by said source is incident upon said element, that one of said rows for which said predetermined range of values contains said derived distance vector.

22. A method of identifying, within a plurality of parallel rows of one or more longitudinally aligned, narrow width apertures in a radiation-opaque mask separating a radiation source from a reference plane, three of said rows through which radiation emitted by said source is incident upon at least first, second and third independent points on a radiation sensitive element positioned between said mask and said reference plane, said mask constructed such that for any adjacent three of said rows, the ratio of:
  (i) distance between a first outward and a central one of said three rows; to,
  (ii) distance between a second outward and said central one of said three rows;
is predetermined and different than said ratio for any other adjacent three of said rows, said method comprising the steps of:
  (a) determining the distance $D_{1-2}$ between said first and second points in a direction parallel to said reference plane and perpendicular to a longitudinal axis of said rows of apertures;
  (b) determining the distance $D_{2-3}$ between said second and third points in said direction parallel to said reference plane and perpendicular to a longitudinal axis of said rows of apertures;
  (c) deriving a distance ratio $R=D_{1-2}/D_{2-3}$;
  (d) selecting, as said three rows through which radiation emitted by said source is incident upon said element, those three of said rows for which said predetermined ratio is closest to said ratio R.

* * * * *